Figure 1:
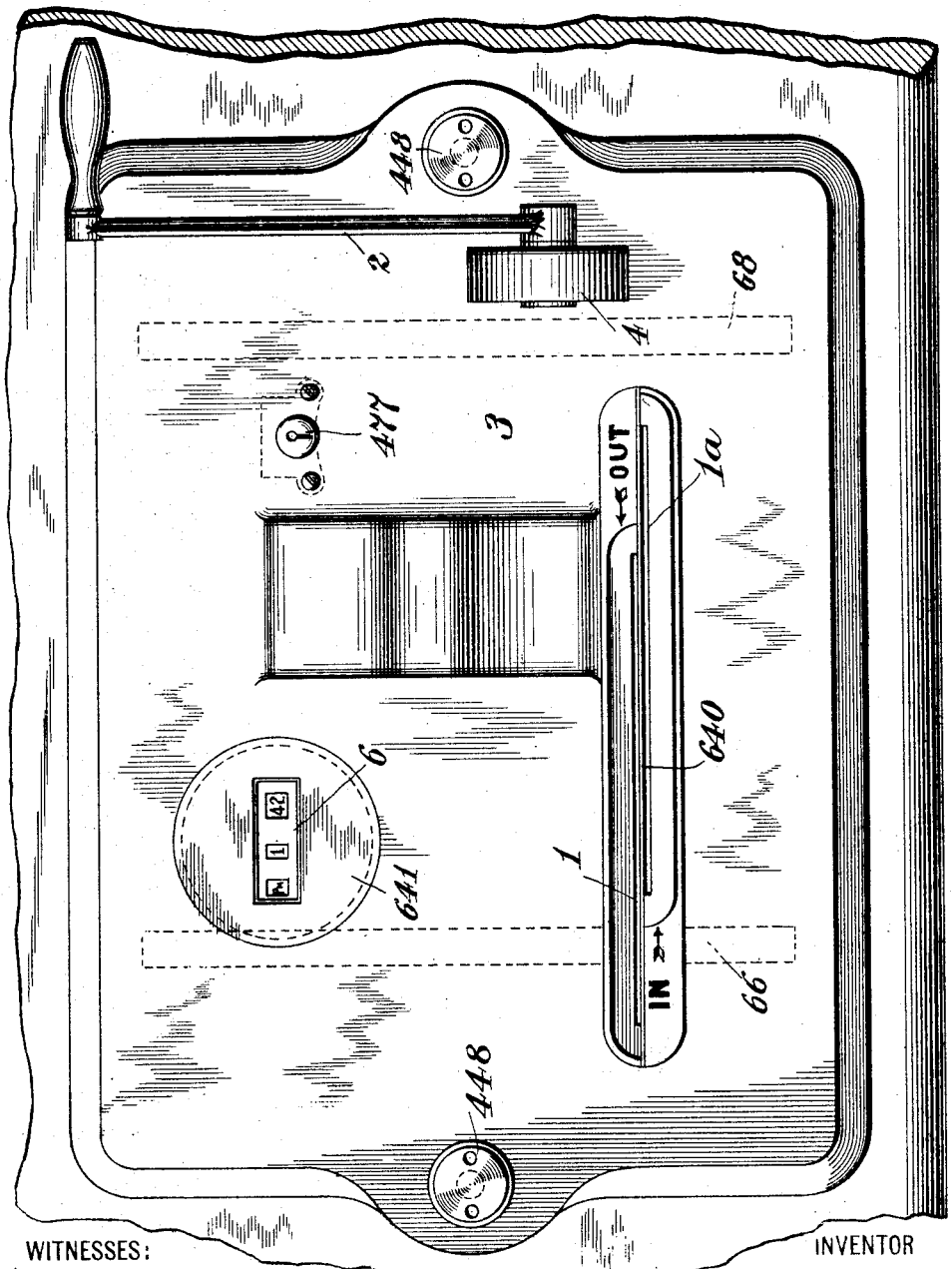

J. W. BRYCE.
TIME INDICATING MACHINE.
APPLICATION FILED OCT. 14, 1910.

1,187,495.

Patented June 20, 1916.
19 SHEETS—SHEET 1.

WITNESSES:
George Schlatt
Geo. M. Harris

INVENTOR
James Wares Bryce
BY Alan D. Kenyon
Kenyon & Kenyon ATTORNEYS

J. W. BRYCE.
TIME INDICATING MACHINE.
APPLICATION FILED OCT. 14, 1910.

1,187,495.

Patented June 20, 1916.
19 SHEETS—SHEET 2.

WITNESSES:
George Schlatt
Geo M Harris

James Ware Bryce
INVENTOR

BY Alan D. Kenyon
Kenyon & Kenyon
ATTORNEYS

J. W. BRYCE.
TIME INDICATING MACHINE.
APPLICATION FILED OCT. 14, 1910.

1,187,495.

Patented June 20, 1916.
19 SHEETS—SHEET 4.

Fig. 4.

WITNESSES:
George Schlatt
Geo. M. Harris

INVENTOR
James Ware Bryce
BY Alan D. Kenyon
Kenyon & Kenyon
ATTORNEYS

J. W. BRYCE.
TIME INDICATING MACHINE.
APPLICATION FILED OCT. 14, 1910.

1,187,495.

Patented June 20, 1916.
19 SHEETS—SHEET 5.

WITNESSES:

INVENTOR
James Ware Bryce
BY
ATTORNEYS

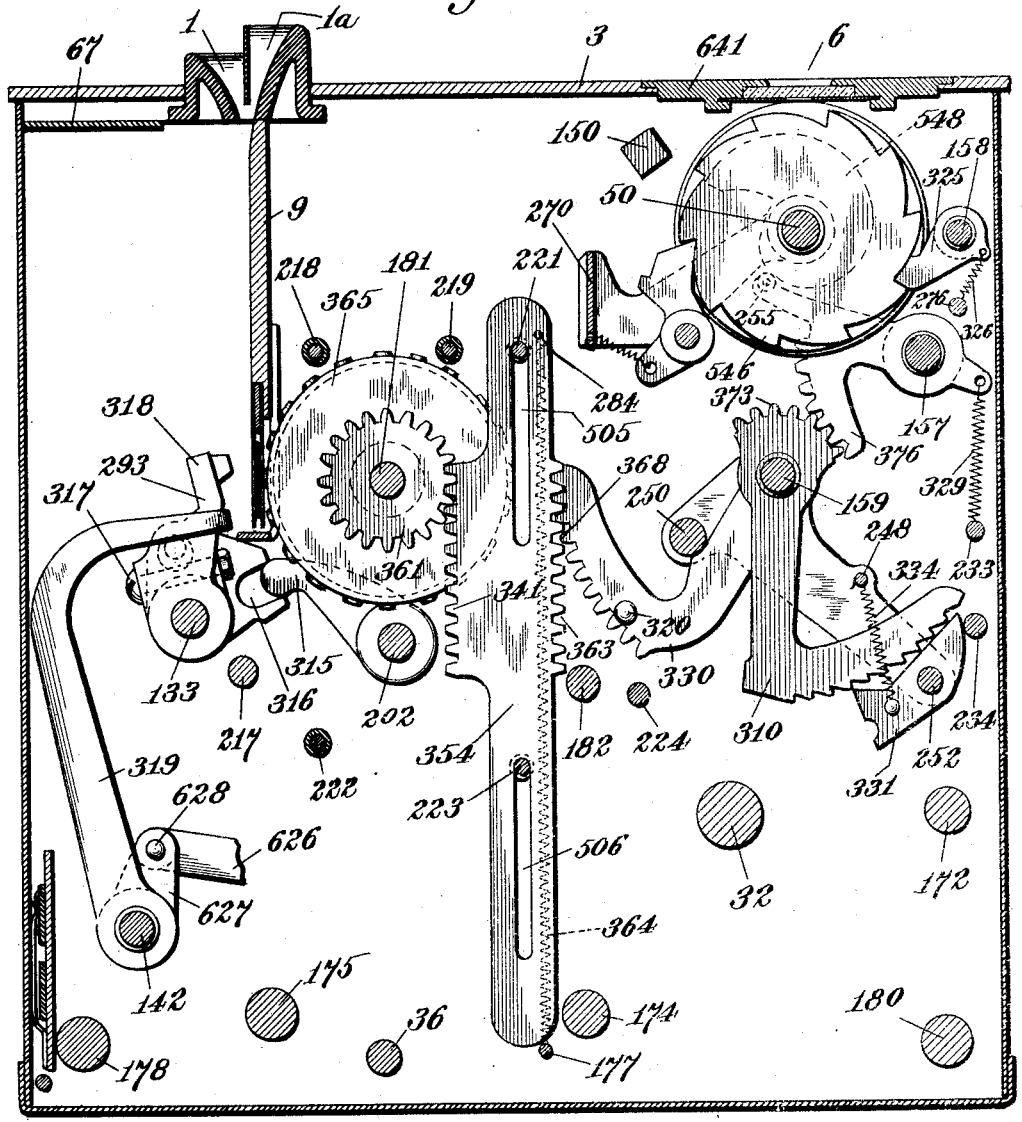

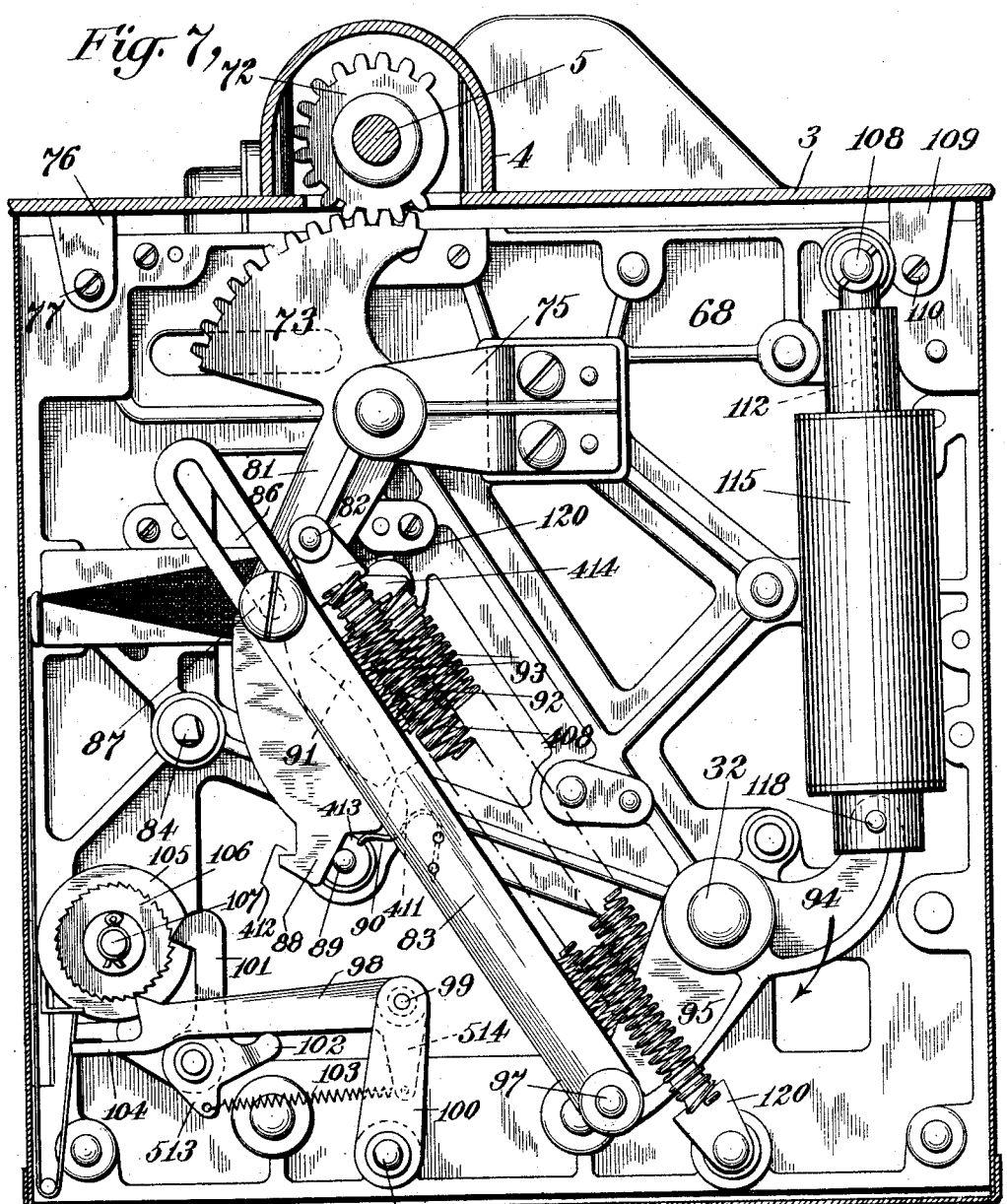

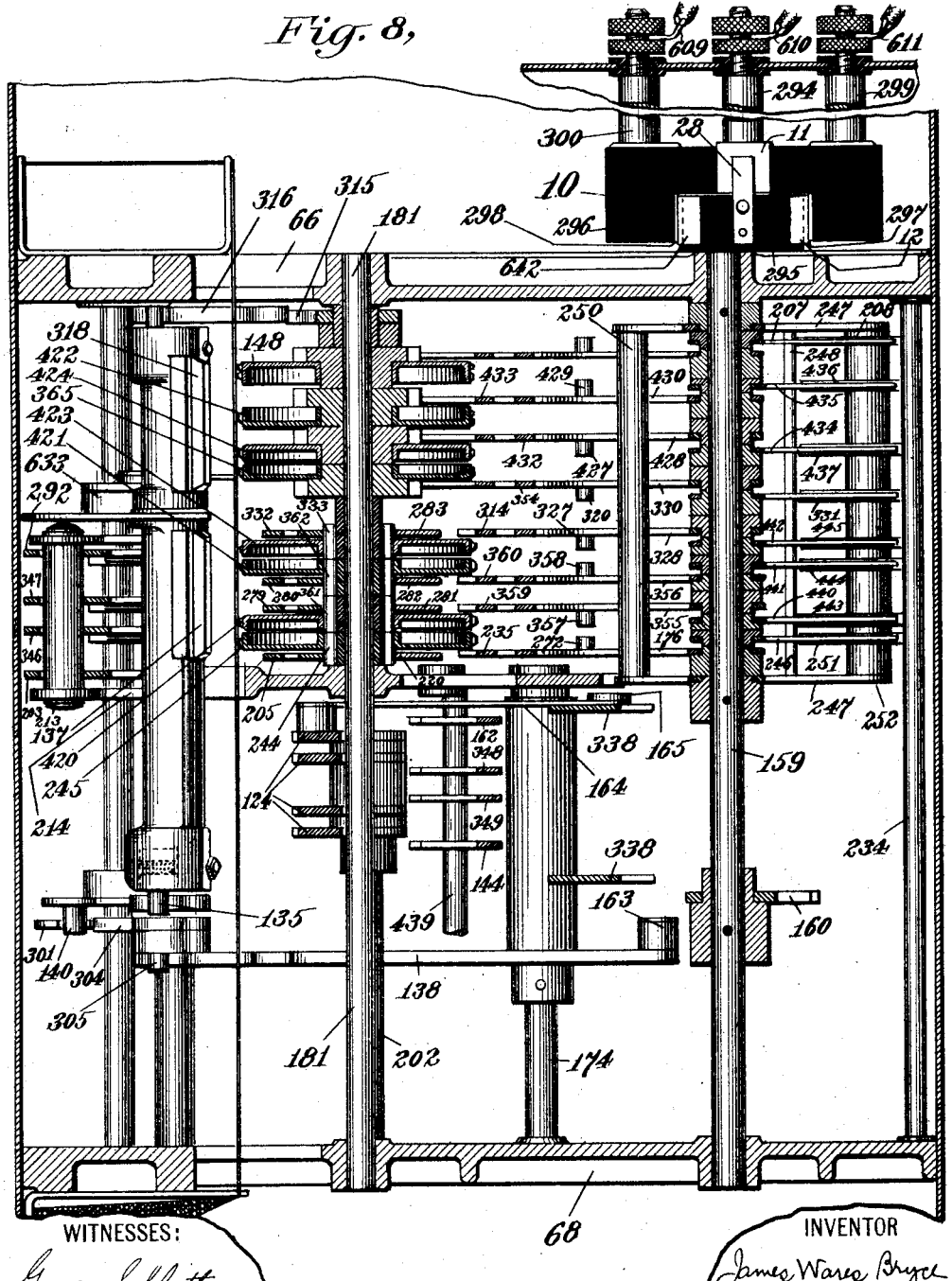

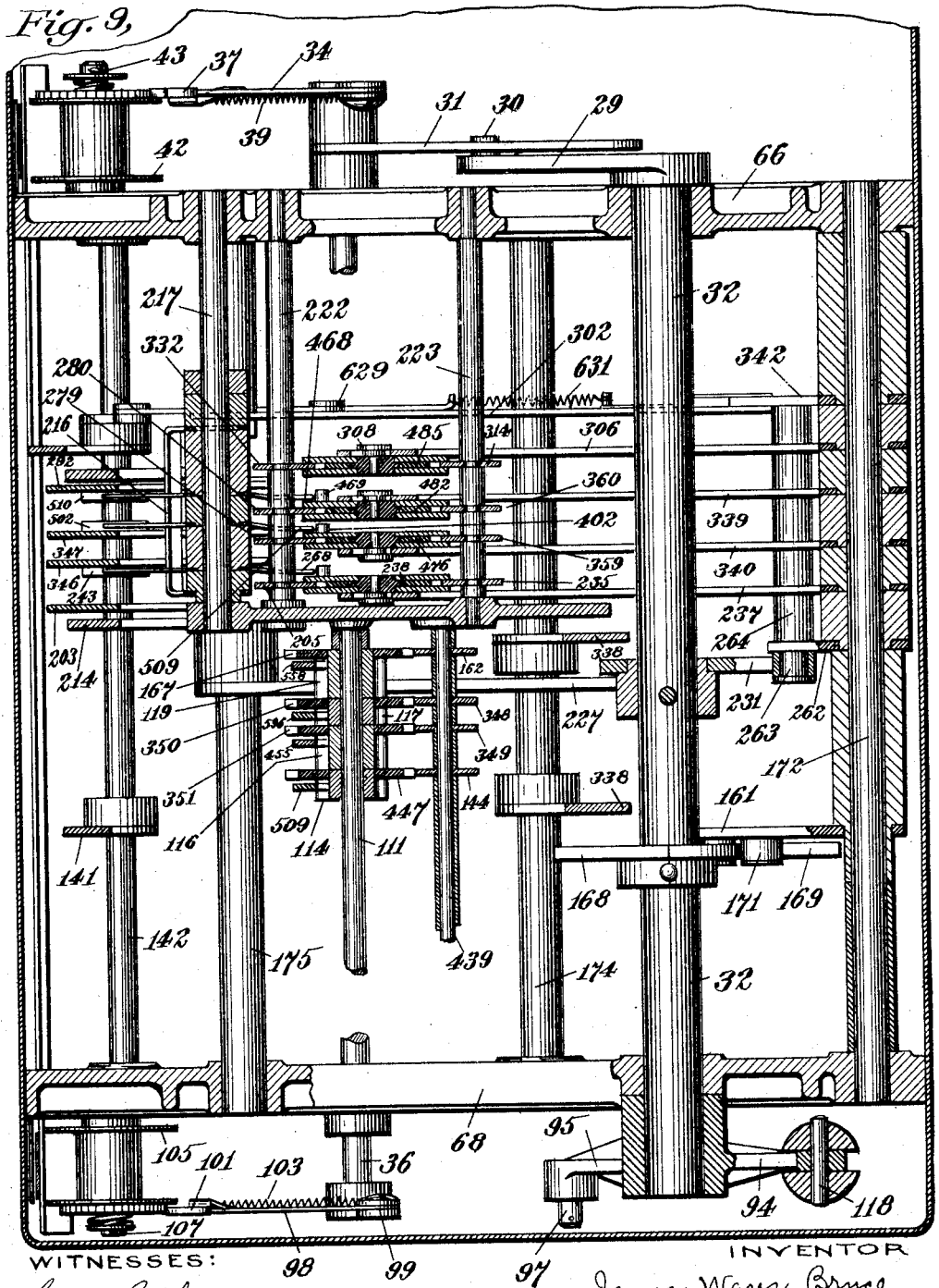

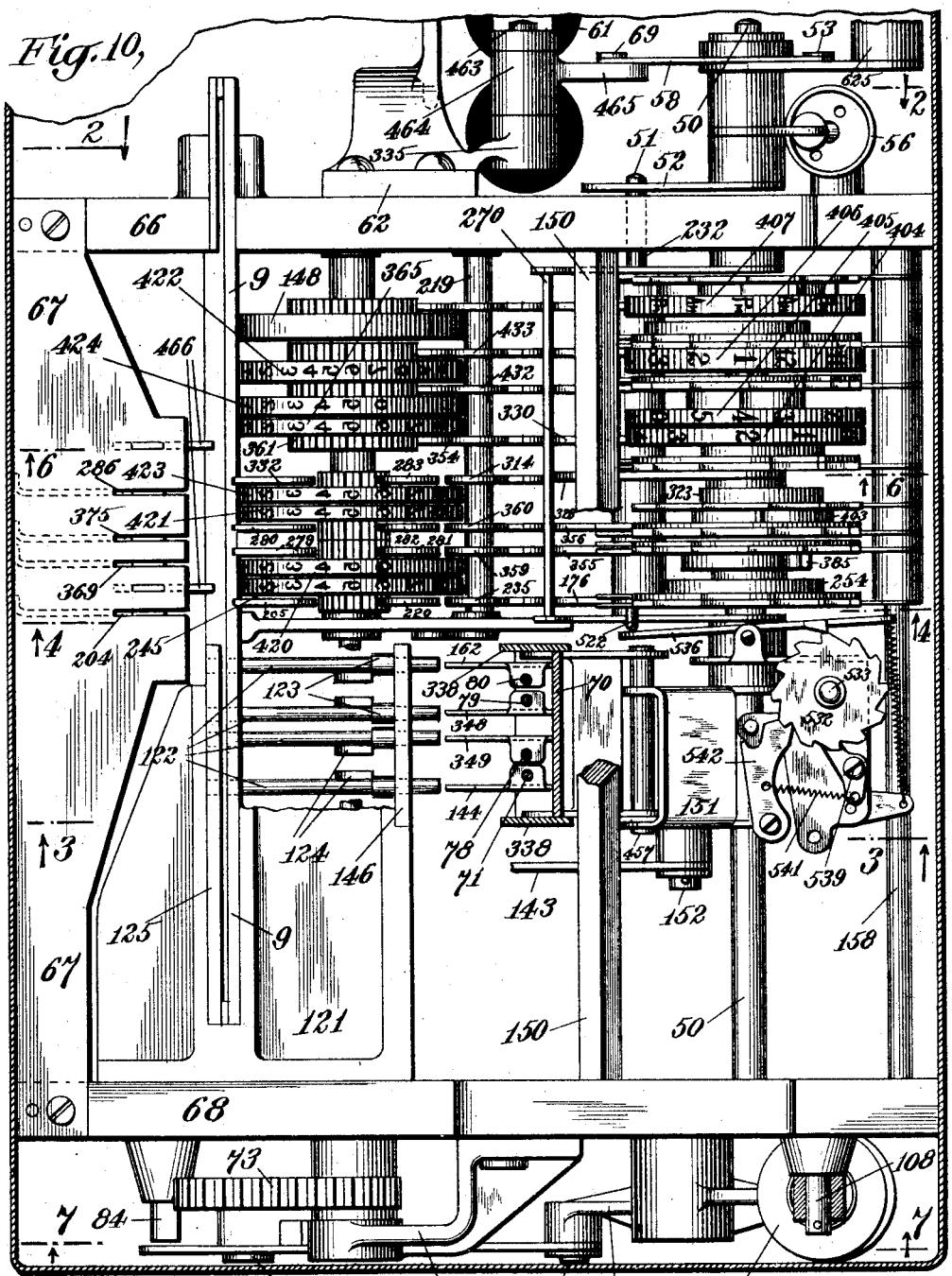

J. W. BRYCE.
TIME INDICATING MACHINE.
APPLICATION FILED OCT. 14, 1910.
1,187,495.
Patented June 20, 1916.
19 SHEETS—SHEET 11.
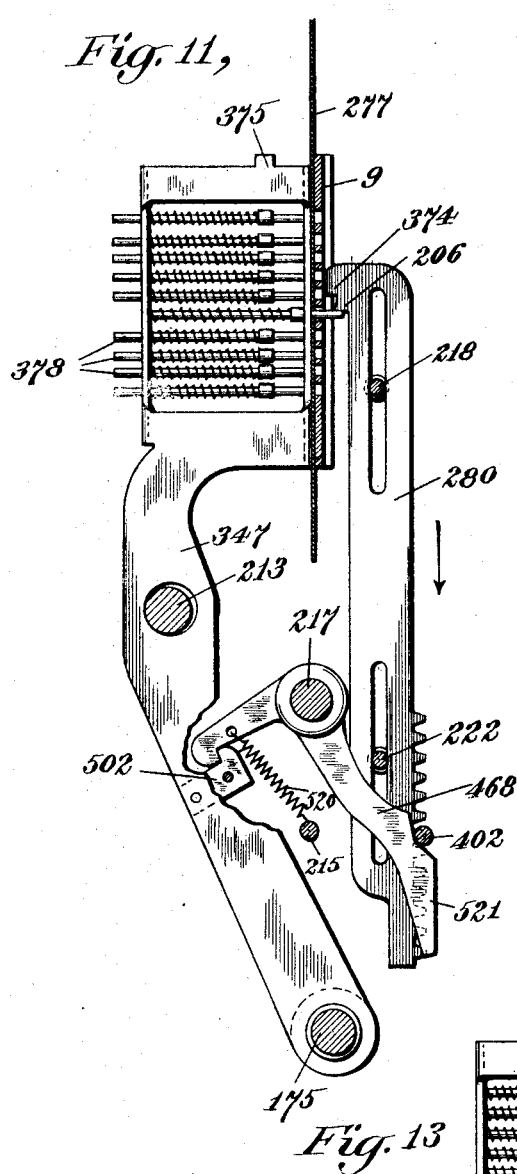
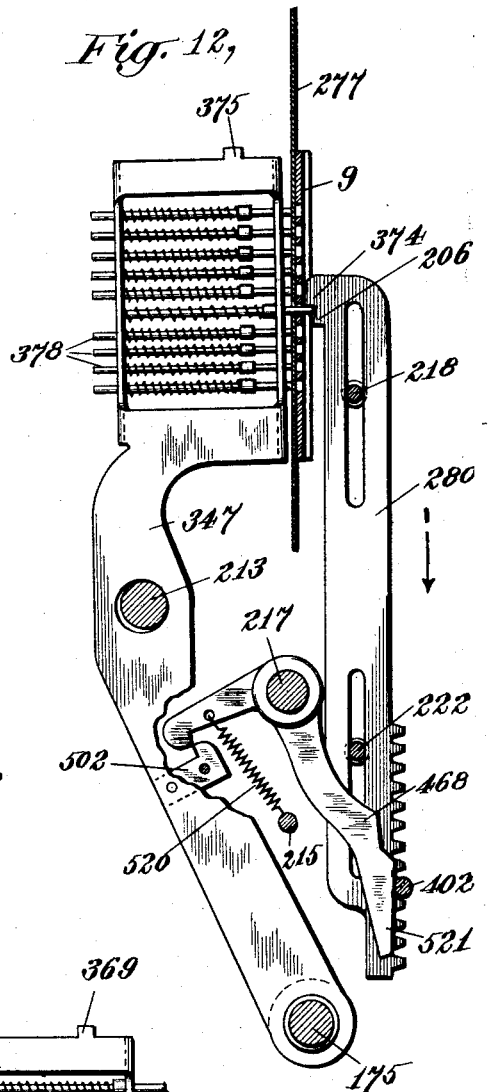
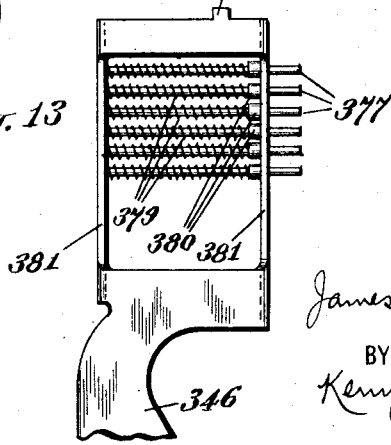
WITNESSES:
George Schlatt
Geo. M. Harris
INVENTOR
James Wares Bryce
BY Alen D. Kenyon
Kenyon & Kenyon
ATTORNEYS

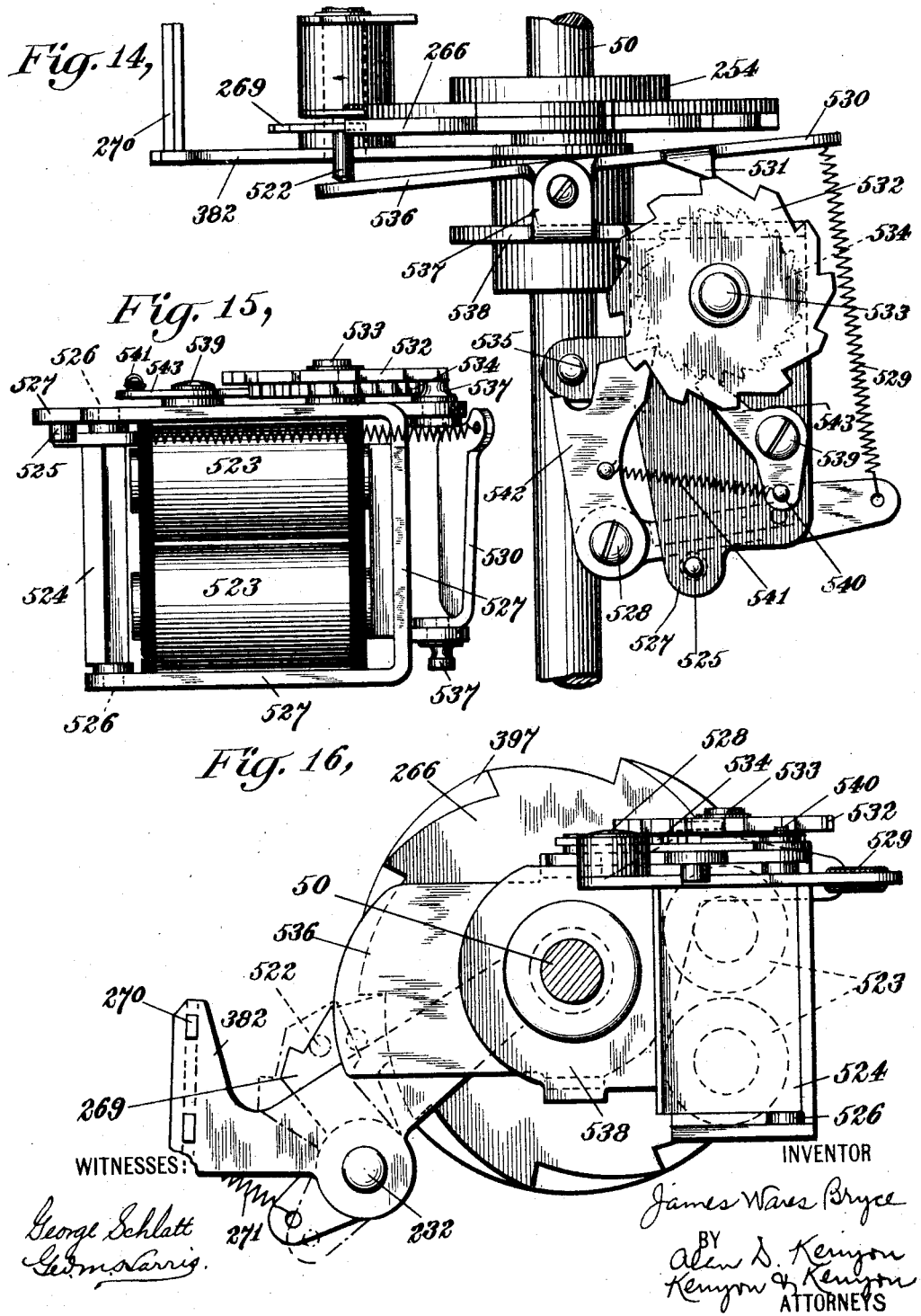

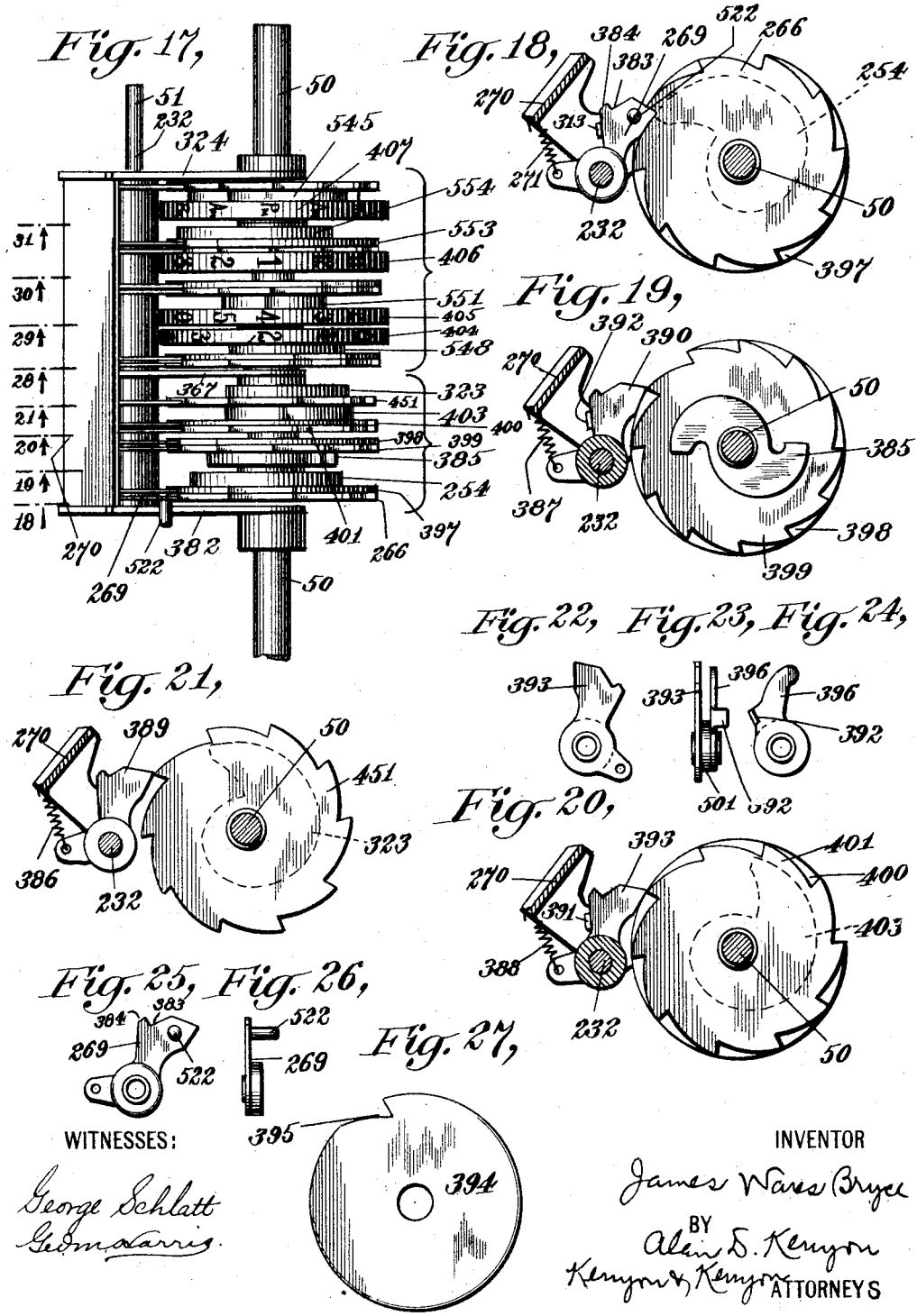

J. W. BRYCE.
TIME INDICATING MACHINE.
APPLICATION FILED OCT. 14, 1910.
1,187,495.
Patented June 20, 1916.
19 SHEETS—SHEET 14.
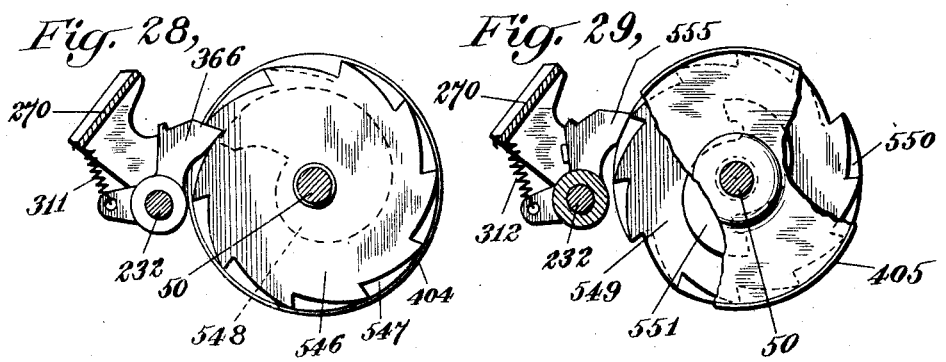
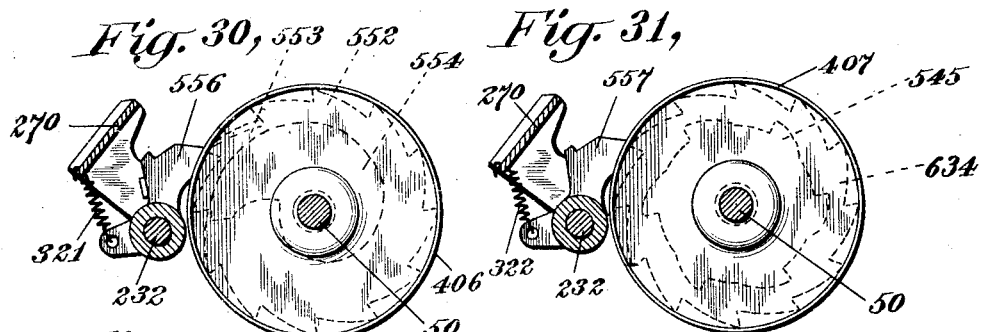
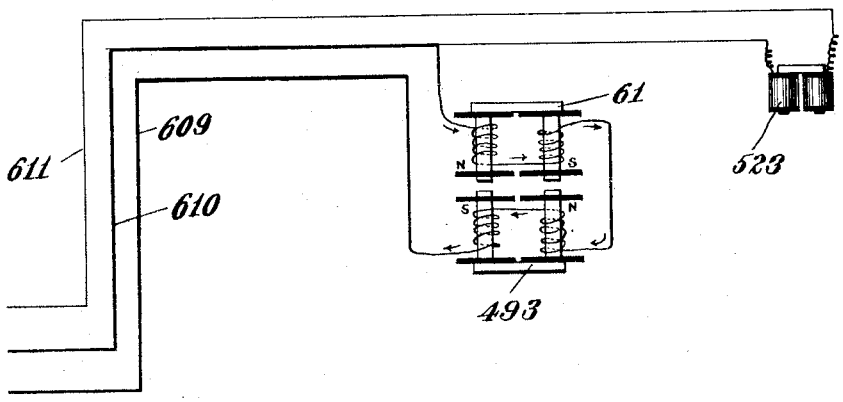
WITNESSES:
George Schlatt.
INVENTOR.
James Wares Bryce
BY Alan D. Kenyon
Kenyon & Kenyon
ATTORNEYS

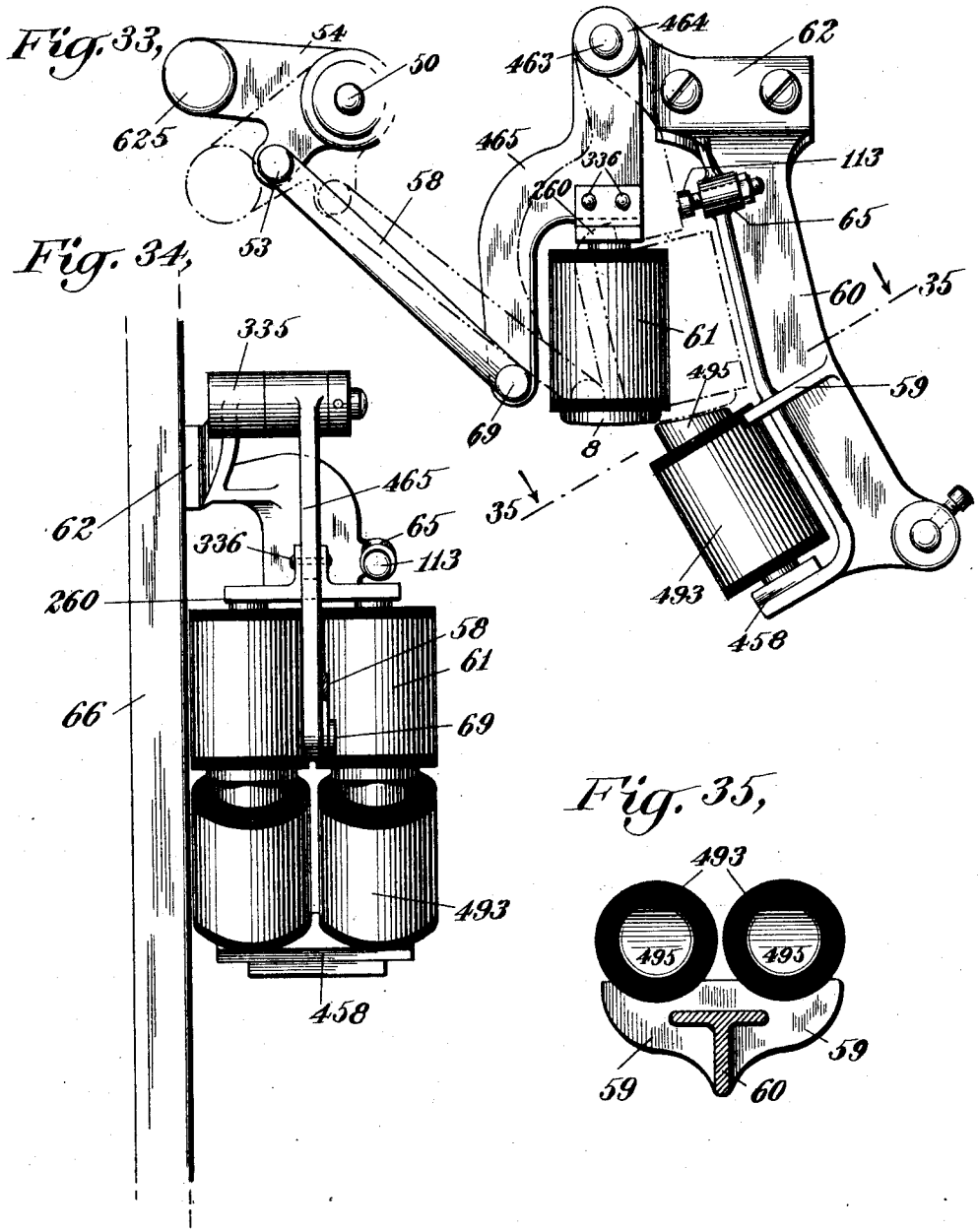

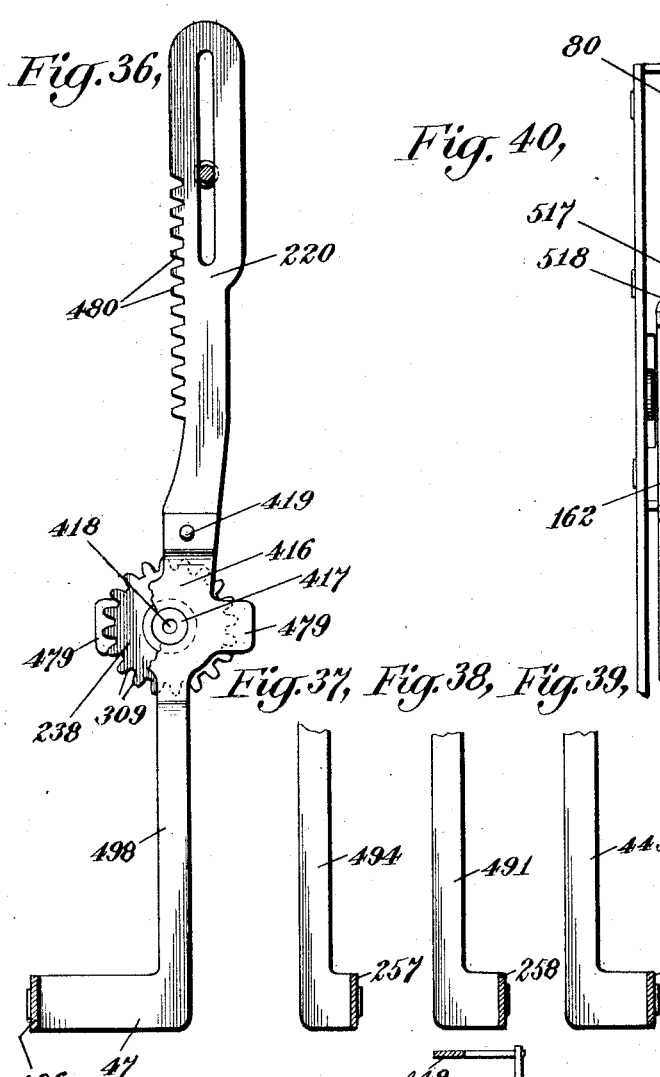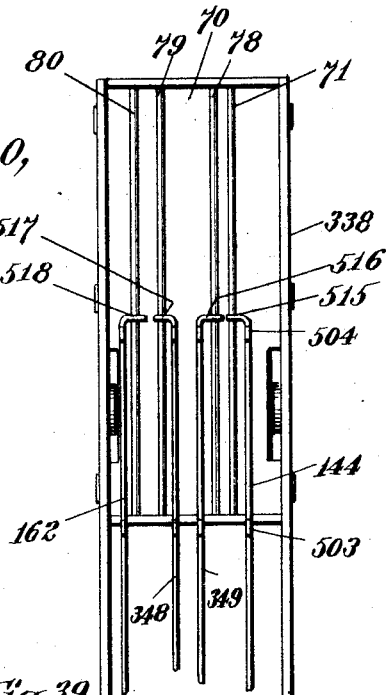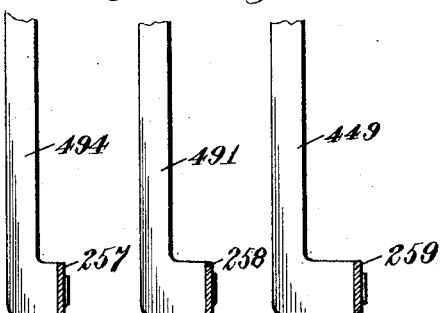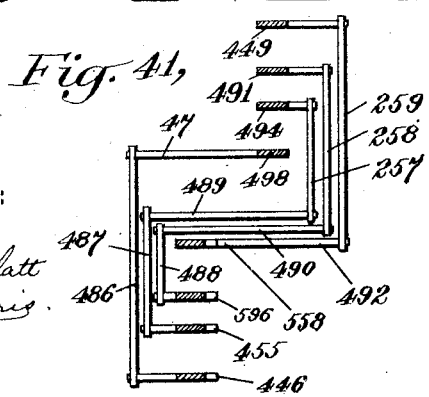

J. W. BRYCE.
TIME INDICATING MACHINE.
APPLICATION FILED OCT. 14, 1910.

1,187,495.

Patented June 20, 1916.
19 SHEETS—SHEET 17.

J. W. BRYCE.
TIME INDICATING MACHINE.
APPLICATION FILED OCT. 14, 1910.
1,187,495.
Patented June 20, 1916.
19 SHEETS—SHEET 18.
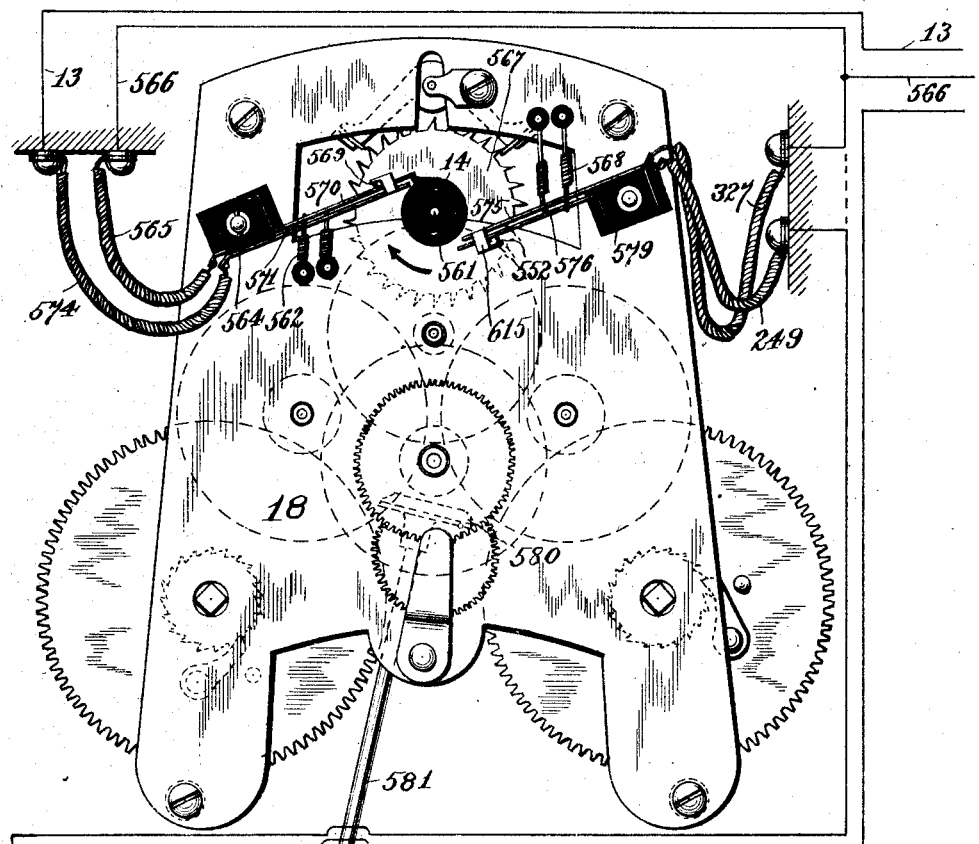
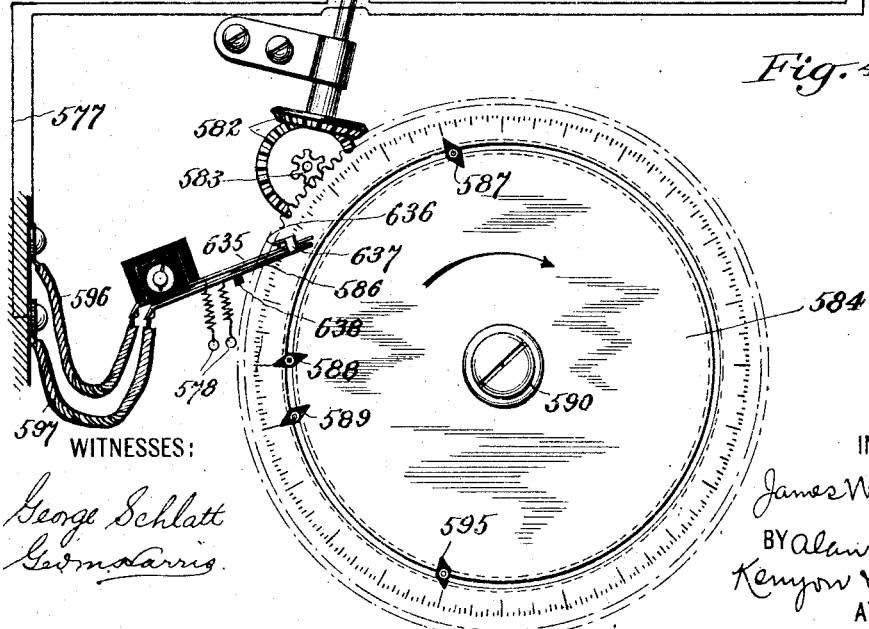
Fig. 46.
WITNESSES:
George Schlatt
Geo. M. Harris
INVENTOR
James Wares Bryce
BY Alan D. Kenyon
Kenyon & Kenyon
ATTORNEYS

J. W. BRYCE.
TIME INDICATING MACHINE.
APPLICATION FILED OCT. 14, 1910.

1,187,495.

Patented June 20, 1916.
19 SHEETS—SHEET 19.

WITNESSES:
George Schlatt

INVENTOR
James Wares Bryce
BY Alan D. Kenyon
Kenyon & Kenyon
ATTORNEYS

UNITED STATES PATENT OFFICE.

JAMES WARES BRYCE, OF BLOOMFIELD, NEW JERSEY, ASSIGNOR TO INTERNATIONAL TIME RECORDING COMPANY OF NEW YORK, OF ENDICOTT, NEW YORK, A CORPORATION OF NEW YORK.

TIME-INDICATING MACHINE.

1,187,495.     Specification of Letters Patent.     Patented June 20, 1916.

Application filed October 14, 1910. Serial No. 587,099.

*To all whom it may concern:*

Be it known that I, JAMES WARES BRYCE, a citizen of the United States, and a resident of Bloomfield, in the county of Essex and State of New Jersey, have invented certain new and useful Improvements in Time-Indicating Machines, of which the following is a specification.

My invention relates to time indicating machines and to time recorders. It is of a special value in machines for indicating elapsed time between two operations and it has for its object to improve, simplify and cheapen the construction of such machines.

My invention consists in the novel devices and combinations shown and described.

In the drawings accompanying this specification and forming a part hereof, I have shown my invention in its preferred form and as embodied in a machine which indicates the time of day of each operation of the machine and upon a second or later operation of the machine by a workman, the elapsed time between the earlier and the later operation and which does such indicating by recording upon a card both by printing figures and by punching holes.

I will now proceed to describe the preferred form of my invention as disclosed in the particular machine shown in the drawings.

Figure 2:
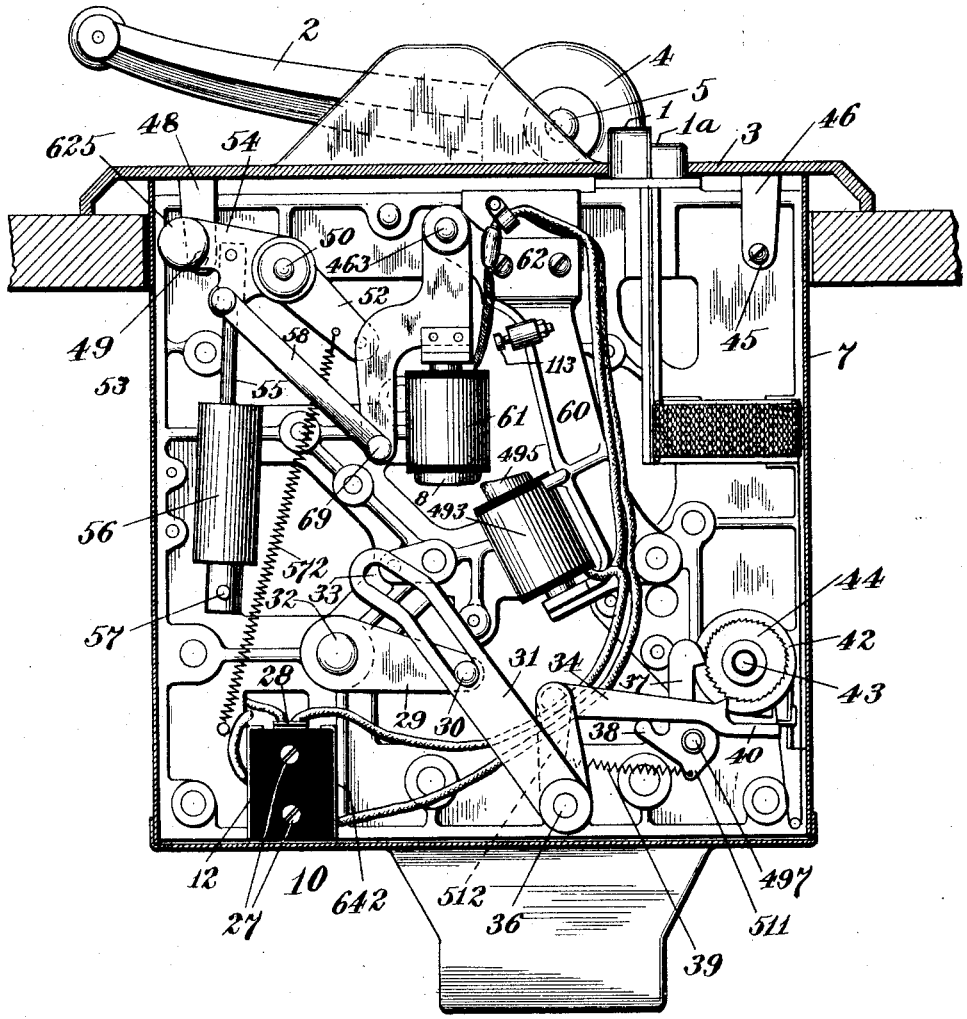
Figure 3:
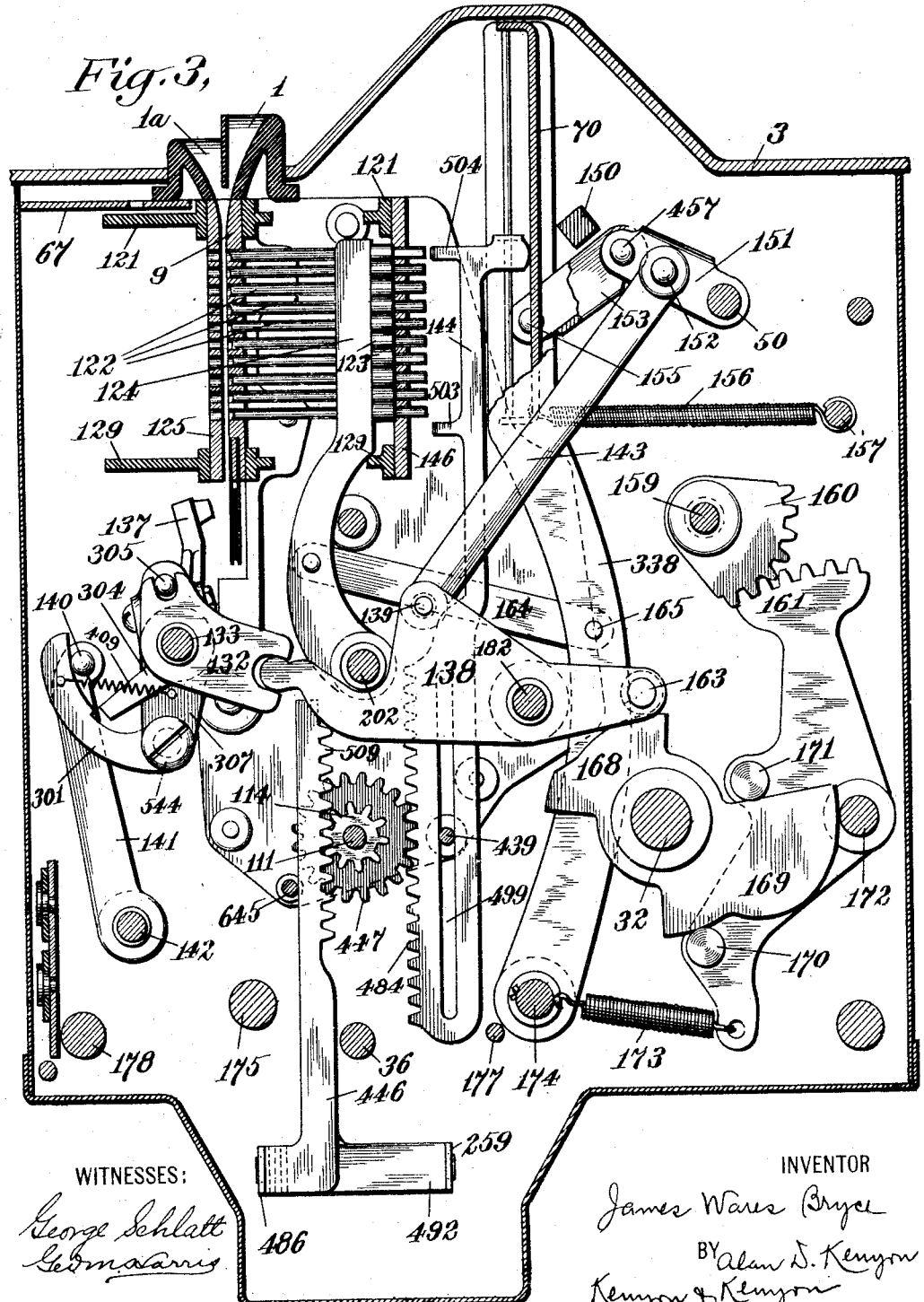
Figure 5:
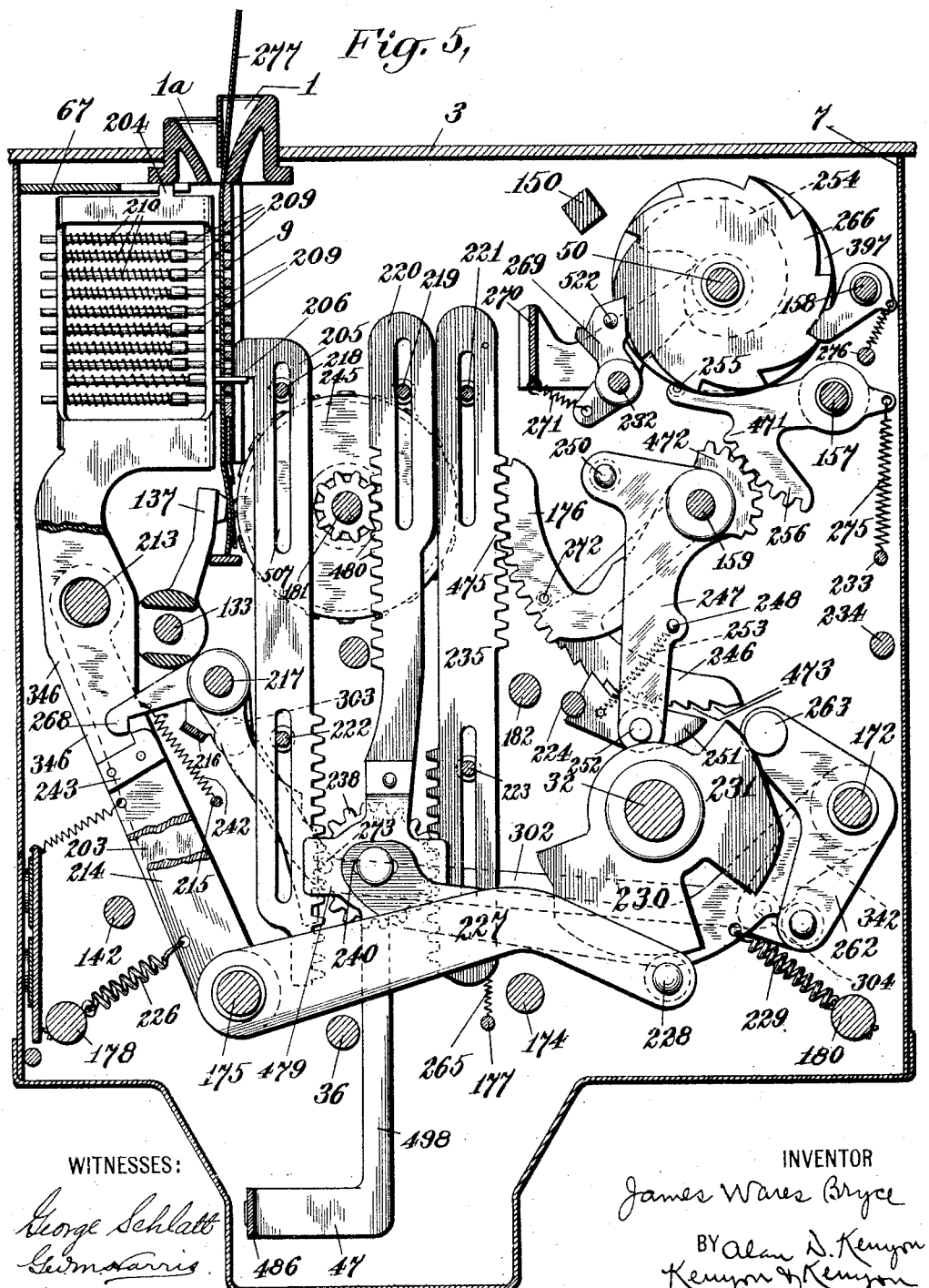
Figure 47:
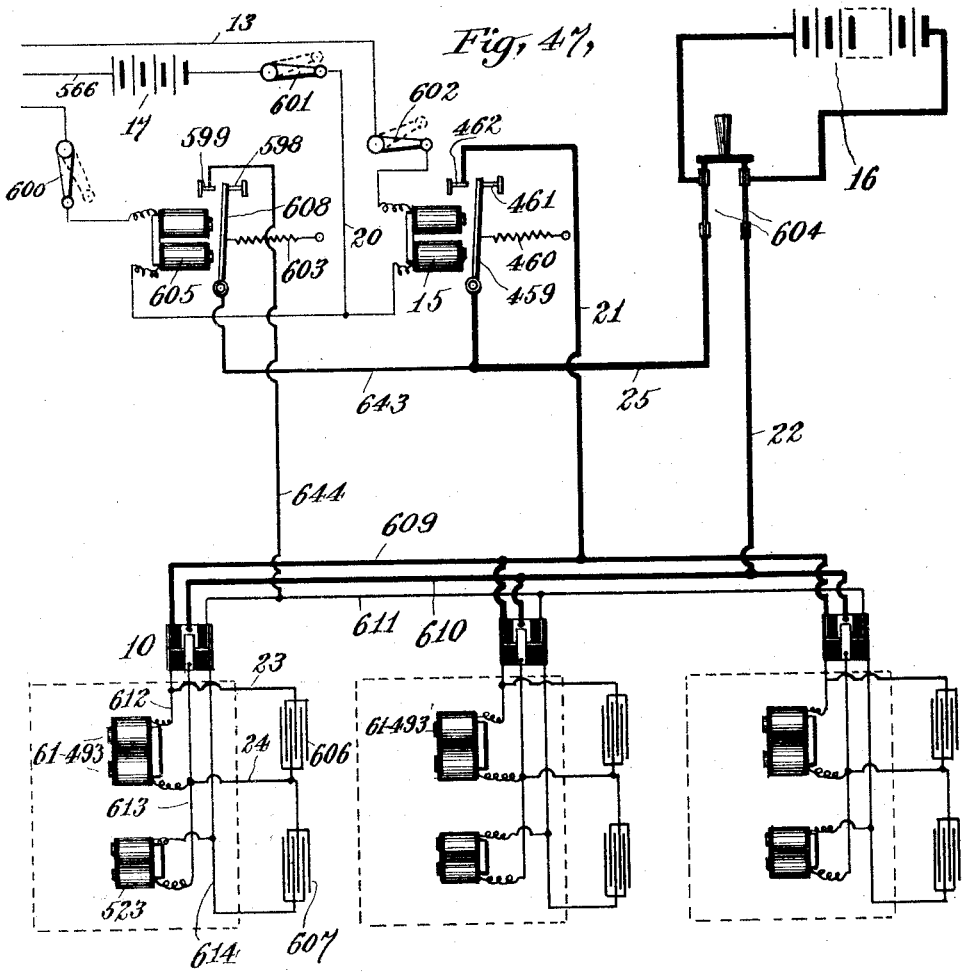

Referring to these drawings, Figure 1 is a top view of the machine showing it set in a table or shelf or desk top. Fig. 2 is a vertical longitudinal section taken just inside the case on the line 2—2 of Fig. 10. Fig. 3 is a vertical longitudinal section taken on the line 3—3 of Fig. 10 and shows the punch mechanism. Fig. 4 is a vertical longitudinal section taken on the line 4—4 of Fig. 10 and shows the elapsed time indicating mechanism of the minute column. Fig. 5 is the same section as that of Fig. 4 with the parts in their recording position. Fig. 6 is a vertical longitudinal section taken on the line 6—6 of Fig. 10, and shows the time-of-day mechanism of the minute column. Fig. 7 is a vertical longitudinal section taken just inside of the opposite side of the case from Fig. 2 on the line 7—7 of Fig. 10, and shows the time-of-day mechanism of the minute column. Fig. 8 is a horizontal section on the line 8—8 of Fig. 4 and shows all of the type wheels. Fig. 9 is a horizontal section on the line 9—9 of Fig. 4 and shows the differential gears. Fig. 10 is a plan of the mechanism with the cover plate removed. Figs. 11 and 12 are detail views of one of the pin boxes showing a pin in set position and illustrating in Fig. 11 the control of the pin over the subtracting rack in the ordinary subtracting operation and in Fig. 12 in the borrowing operation. Fig. 13 is a detail of the special pin box of the tens of minute column. Fig. 14 is an enlarged detail plan view of the magnetic cut out mechanism. Fig. 15 is a side view of the same, and Fig. 16 an end view. Fig. 17 is a plan view of the indicating wheels, the timing cams and the elapsed-time timing cams, the parts being shown with their shaft as if removed from the machine. The various cams are shown in this figure as in the same relative positions shown in the detail sections of the same respectively shown in the drawings. Figs. 18, 19, 20 and 21 are sections taken on the lines 18, 19, 20 and 21 of Fig. 17, showing respectively the minute, tens of minute, hours and tens of hours cams and connecting parts of the elapsed time set of timing cams. Fig. 22 is a detail of the pawl for turning the hour ratchet. Fig. 23 is a side view of the part shown in Fig. 22 and shows the pawl secured to the same base that carries the wiper resting on the tens of minute disk. Fig. 24 is a detail of the wiper of the tens of minute column. Fig. 25 is a detail side view and Fig. 26 an edge view of the minute pawl. Fig. 27 is a detail side view of one of the wiper disks. Figs. 28, 29, 30 and 31 are sections taken on the lines 28, 29, 30 and 31 of Fig. 17, showing the time-of-day, minute, tens of minute and hour cams, and the A. M. and P. M. wheel and cam and their separate and connecting parts. Fig. 32 is a diagrammatic view of the circuits of the motor or operating magnet. Fig. 33 is a side view of the same magnet, Fig. 34 an end view and Fig. 35 a detail section through the said magnet. Fig. 36 is a side view of the minute elapsed time differential, showing a part of the cross over mechanism of the punch selectors. Figs. 37, 38, and 39 show similar parts of the cross over connections to the tens of minutes, hours and tens of hour punch selectors. Fig. 40 is a detail face view of the punch selectors. Fig. 41 is a detail horizontal section through the punch selectors, showing the cross overs. Fig. 42 is a view of a card after the "in" operation. Fig. 43 is a view of the card after the "out" or second operation. Fig. 44 is a view of the top of the reversed side of the card. Fig. 45 shows a part of a modified form of card provided with a scale upon which elapsed time is punched. Fig. 46 is a semi-diagrammatic view showing the master-clock mechanism and means by which the cut-out mechanism is controlled. Fig. 47 is a diagram of circuits and relays for controlling several elapsed time machines.

In order that the construction and operation of my improved machine, shown in the drawings, may be more easily understood, I will first describe, in a general way, the manner of its operation by an operator and the results accomplished by such operation and how they are attained, and later on I will describe in detail the specific mechanism by which the results are obtained.

When an operator begins his day's work or begins a job at any time, he inserts his card 624 in the right-hand slot 1ª marked "In" in Fig. 1. The card slot is composed of two parts, a right-hand or "in" one and a left-hand or "out" one, as clearly shown in Fig. 1, the two slots overlapping each other and being slightly out of line. Fig. 1 shows a plate 640 between the two slots. The two slots are made to slightly overlap, so that the card in the "in" slot will be slightly to the right of the position of the card when in the "out" slot. This in the "in" operation will bring the "in" space 620 on the card (Fig. 42) opposite the A. M. and P. M. typewheel 148 and the time-of-day hour, tens of minutes and minutes type wheels 422, 424 and 365 (Fig. 8) and will bring the right-hand end of the card opposite the punches 122 (Fig. 10) so that the time identification holes 619 (Fig. 42), 618, 617 and 616 (representing the tens of hours, hours, tens of minutes and minutes respectively of the time of the first operation) will appear at the right of the card, as in Fig. 42. On the second or "out" operation the placing of the card in the "out" slot will bring the space 621 at the top of the card marked "Out" in Fig. 42 opposite to the time-of-day wheels 148, 422, 424 and 365, will bring the time identification holes 619—616 opposite the pin boxes and subtractor racks and will bring the space 622 headed "Working time" in Fig. 42 opposite the tens of hours, hours, tens of minutes and minutes elapsed time type wheels 423, 421, 420 and 245 (Figs. 8 and 10). The "out" and "in" slots are so slightly separated that the card in either slot will lie close to the various typewheels and printing and punching devices. In inserting the card into the slot, the workman inserts it with the spaces 620, 621, 622 at the bottom and facing the type wheels, or in other words, with the back of the card with the words "Working time, this side out" facing him (see Fig. 44) and with the part of the card with the above quoted words at the top. This will bring the spaces 620, 621, 622 at the bottom and facing the type wheels. The workman then pulls handle 2, mounted on shaft 5 in casing 4, forward the full extent of its movement and lets it go, the handle being automatically returned to its original position. This moves the main cam shaft 32 of the machine and operates the various parts of the mechanism. It causes certain punches representing the time of the operation to be selected and to be later operated to punch holes in the card, 619—616, which by their location upon the card represent the time of such operation. It also causes the time-of-day type wheels to print in the "in" space 620 at the upper left-hand corner of the card, as viewed in Fig. 42 the time of said operation. In the example shown in Fig. 42, this time is "AM 9 48". This movement of handle 2 also has fed the ink ribbon. When the workman finishes his day's work or has ended his job at any time, he inserts his card into the left-hand slot 1 and again pulls handle 2 forward. This causes the time-of-day wheels to print the time of the operation in the "out" space 621 shown on Fig. 43. The time there given for the "out" operation is "PM 1 42". The movement of handle 2 has also caused the elapsed time type wheels 423, 421, 420 and 245 and also certain punch selectors 162, 348, 349 and 144, all of which stand normally at zero, to be moved in two ways. The movement in one way, in the adding direction, brings them into a position to correspond with the position or condition at that instant of corresponding elapsed time timing cams, 323 the tens of hours cam, 403 the hours, 385 the tens of minutes and 254 the minutes (see Figs. 10 and 17). These cams are clock controlled but are not continuously driven, their condition at any time representing, not the true time at that instant, but the total in tens of hours, hours, tens of minutes and minutes of the working hours up to that time.

Certain connecting means, actuated by handle 2, including differential devices, move the elapsed time type wheels and the punch selectors to correspond to this time condition of the timing cams. The movement of the elapsed time type wheels and the punch selectors in the other direction, the subtracting direction, is controlled by and is in accordance with the position or condition of the elapsed time timing cams as it existed at the time of the first operation of the machine by the same workman, or in other words, the condition of such cams at the first operation is subtracted from their condition at the time of the second operation, giving the elapsed time between the two. This subtracting operation is accomplished by means of subtracting racks, which are released by handle 2, and which fall by their own weight, and which thereby turn the differentials in the reverse or subtracting direction. In the second operation, their falling movement is limited by the position of pins which are brought by the action of handle 2 against the card in vertical alinement with the respective holes punched in the card 619—616. The pin in each series of pins corresponding with each of these holes passes through said hole in the card and projects beyond into the path of the corresponding subtracting rack, an illustration of this being shown in Fig. 11, where one of the pins 378 projects through a hole in card 277 into the path of a shelf 206 of the subtractor rack 280 and limits its downward movement. The subtractor racks engage with the differentials and these with the elapsed time type wheels and punch selectors and move them in the reverse or subtracting direction. The resultant of the two movements, the adding movement and the subtracting movement, brings upon the printing line of the type wheels the type representing the elapsed time between the first and second operation by the particular workman and causes the punch selectors to select the punches representing the same elapsed time. This elapsed time, on the second operation of the machine, is printed on the card on the space 622 (Fig. 43) under the heading "Working time", as there shown the elapsed time being 47 hours, 54 minutes, and holes 591, 592, 593 and 594 are punched in space 573 of the card (see Fig. 43) representing this same time. It will be noted that this is a long period, covering a time much longer than that of a single day, the job in question having commenced a number of days prior to the second or "out" operation. This time, moreover, includes only the time within working hours and excludes the time outside of them. I accomplish the result of obtaining elapsed time running over a period longer than a half a day or a day and including only the working hours of such days as the job may continue over by means presently to be described. The actuation of handle 2 on the "out" operation has also fed the ink ribbon and accomplished certain other minor results to be presently described.

6 is a window in the top casing of the machine, through which are shown the indications of time-of-day indicating wheels 407, 406, 405, 404 (Figs. 1 and 10). These indicating wheels are driven synchronously with the time-of-day timing cams and always represent the true time. The time represented in window 6 in Fig. 1 is "PM 1 42".

I will now proceed to describe in detail the specific mechanism in all its parts shown in the drawings.

The timing cams are driven by clockwork. They consist of two separate and independent sets of timing cams, the time-of-day cams 545, 554, 551 and 548 (Fig. 17) and the other the elapsed time timing cams 323, 403, 385 and 254 (Fig. 17). The former set control the time-of-day indication of the time-of-day indicating mechanism, as shown the time-of-day indicating wheels and type wheels. The latter set through the differentials affect the extent of movement of the elapsed time indicating mechanism, as shown the elapsed time type wheels, and also of the punch selectors. The time-of-day set of timing cams are driven continuously by clockwork means and always represent by their condition the true time-of-day. The elapsed time timing cams are, preferably and as shown, driven by clock-controlled means, but are not continuously driven at all times, but are at times disconnected from their driving or controlling means and remain at rest for predetermined periods. This is for the purpose of cutting out those hours not included within the working hours. The elapsed time timing cams are operatively connected with the clock-controlled driving means at the commencement of working hours and are operatively disconnected at their close, either at noon or at the close of the day and this is done automatically. The result is that after a workman "rings in" at the beginning of a job he can work on the job for a period longer than over lunch or the close of the day or covering a period of days before he "rings out" or performs the second or "out" operation on the machine. No matter how long a time (within the range of the machine, which is, however, capable of indefinite expansion) this may be, the correct elapsed time in working hours and minutes will, at the second operation, be printed and be punched upon the card. I will first describe the time-of-day cams and the clock-controlled means for driving them and will later describe the elapsed time timing cams.

*Time-of-day timing cams, clock-controlled means for driving them and the time-of-day indicating wheels.*—These are specially illustrated in Figs. 2, 6, 10, 17 and 28-31. 545 is the "A. M." and "P. M." time-of-day cam (Fig. 31). It is loose on shaft 50, but has fast to it a ratchet 634 and an A. M. and P. M. indicating wheel 407. The cam 545 is shown in detail in Fig. 31 and has six rises. The cam and connecting parts are fed forward by pawl 557, loose on rod 232, a spring 322 secured to one end of the pawl and to frame 270 holding the pawl in engagement with the ratchet. 554 is the hour time-of-day cam (Fig. 30) and is similarly loosely mounted on shaft 50 and has secured to it a ratchet 552, an hour indicating wheel 406 and it is fed forward by pawl 556 loose on rod 232 and has spring 321 holding it in engagement. Cam 554 has but one rise and its ratchet 552 is provided with twelve teeth for the hours. 551 is the tens of minutes time-of-day cam (Fig. 29). It is similarly mounted and has corresponding ratchet 549, indicating wheel 405, pawl 555 and spring 312. Cam 551 has two rises with six ratchet teeth for each rise. Fast to cam 551 is a disk 550 for carrying one to the hour cam, as will be presently described. 548 (see Fig. 28) is the minute time-of-day cam similarly mounted, having but one rise, having ratchet 546, ten teeth, indicating wheel 404 and carrying disk 547, feeding pawl 366 with its spring 311.

The timing cams, including the time-of-day cams, are driven or actuated by clock-controlled means. Any suitable means for this purpose may be employed, at least so far as some of the features of my invention are concerned. I have, however, devised an improved motor or driving device for actuating the timing cams and through them the indicating mechanism. In my preferred form these are magnetically controlled or operated. My improved motor device is made in two parts, one fixed and the other movable, the latter being connected to and adapted to actuate the timing cams. The movable member is preferably made so as to swing and the connections between it and the timing cams are preferably secured to it at its free or outer end. In practice I prefer to use a magnetically controlled or operated driving mechanism. That shown in the drawings consists of a magnetic device consisting of two parts, viz. a movable or swinging magnet 61 and a fixed magnet 493 (Figs. 2, 33–35). Preferably these two parts are in the same circuit and form one magnet. The part 61 is secured by bracket 260 to a swinging arm 465 by pins 336, the arm having a boss 464 normally and loosely mounted on pivot pin 463, fast in boss 335 secured to bracket 62 fastened to side frame 66. 113 adjustably mounted in boss 65 integral with bracket 60, is a stop for limiting in one way the movement of magnet 61. The other part of the magnet 493 is fixed by yoke 458 to bracket 60, rib 59 aiding in supporting magnet 493. Preferably both magnets 61 and 493 are provided with two pole pieces 8 and 492, respectively. These pole pieces are preferably slightly and concentrically curved, as shown in Fig. 33 and the pole of magnet 61 is normally out of line with magnet 493, but when the magnets are energized the poles will be drawn into line. It will of course be understood that the opposite poles of the two magnets are of opposite polarity. Where each magnet has two cores, as shown in the drawings, the windings around the two cores or pole pieces of each magnet are preferably reversed one to the other, as shown in Fig. 32. In practice I prefer to have both magnets 61 and 493 in the same circuit, although this is not essential.

The circuits I prefer to use will be explained in detail later on.

Magnets 61 and 493 are energized and de-energized at regular stated intervals. In the machine shown this occurs every minute. It can be effected or controlled by any suitable clock movement. Devices for this purpose are shown and will be described farther on. Of these devices 16 (Figs. 32 and 47) represents any source of electrical power, as shown a primary battery, and this is connected by suitable wiring with magnets 61 and 493 and also with cut out magnet 523.

At 69 the outer or free end of swinging arm 465 is pivoted a link 58 and this is pivoted at 53, its other end, to bell-crank lever 54, loose on shaft 50. 625 is a counterweight. 52 (Fig. 2) is another arm of bell-crank lever 54. A spring 572 (Fig. 2) tends to hold the parts in the position shown in Figs. 2 and 33 with the magnets separated or out of line with each other. Rod 232, to which the feeding pawls above described are secured, has its end 51 fast in the end of bell crank 52 and is mounted in frames 324, 367 and 382 (see Fig. 17). 270 is a frame carried by side frames 324, 367, 382, to which the various springs 311, 312, 321 and 322 are secured. At every energization of magnet 61, rod 232 and frame 270 are rocked upward, carrying with them the feeding pawls and causing any one of those pawls, if in engagement with its corresponding ratchet, to feed the corresponding cam one point. Secured to the other end 54 of bell crank 52, which is loosely mounted on shaft 50, is a piston rod 55 of an oil dash-pot 56, loosely pivoted at 57 to the framework. As this dash-pot can be of any suitable construction, its details are not shown. It is for the purpose of preventing too rapid an action of the armature and its connecting parts, and to secure practically noiseless action.

Pawl 366 of the minute time-of-day cam 548 is always in engagement with its ratchet and magnet 61 at every energization, that is, once every minute, will feed forward the cam one unit. Pawls 555 and 556 of the tens of minutes and hour time cams are normally held out of engagement with their respective ratchets 549 and 554, but at the end of a complete revolution of the cam of the next lower denomination, each one of these pawls is let into engagement for one unit of time with its ratchet wheel and at the succeeding energization of magnet 61, feeds forward its cam one point, when it is again removed from engagement with the ratchet. The means for accomplishing this consist of a wiper disk fast with each cam, 547 for the minutes, 550 for the tens of minutes cam and 553 for the hour. Each disk is constructed as shown in Fig. 27. The disk 394 is provided with a notch or notches 395. Each other disk is similarly provided. The pawl of the next higher denomination is provided with a finger fast to its sleeve, having a projection resting upon the disk of the next lower denomination. The same arrangement for carrying is provided between each wheel and the next higher wheel. It is illustrated in Figs. 22, 23 and 24 for the tens of minutes to hours elapsed time wheels. There the pawl 393 has a sleeve 501, to which it is fast and fast to that is a finger 396 having a side projection 392. The finger 396 rests against the periphery of the disk of the next lower order (in this case tens of minutes) and this holds the pawl out of engagement with its own ratchet normally, but at the conclusion of a complete revolution (or as in this case ½ a revolution) of the cam of the next lower denomination, the finger 396 enters a notch corresponding to notch 395 of disk 394, letting its pawl into engagement with its ratchet. At the next actuation of magnet 61, the pawl feeds its ratchet, but immediately thereafter finger 396 rides up on the periphery of the disk and lifts the pawl out of engagement with its ratchet. In this way, the cam of the lowest denomination is continuously driven by clock-controlled means and one is carried at each revolution to the wheel of the next higher denomination and so on.

150 is a squared stop bar secured in the side frames for preventing the overthrow of the feeding pawls. As all of these pawls except the lowest may occupy either one or the other of two positions, I preferably provide each pawl with a notch 383 and surface 384 (Fig. 18), one or the other of which will strike the stop bar 150 and the pawls be forced inward and jammed between the bar and the tooth of the ratchet wheel and thus prevent excessive movement on the part of the wheel.

The cams and pawls shown in the various sections are shown in the positions they occupy at the second or "out" operation of the machine represented on the card as occurring at 1.42 P. M.

The time-of-day cams are thus always continuously driven and are always in a position to represent the true time. The A. M. and P. M. cam is advanced one notch at each complete revolution of the hour wheel. For purposes of indication through window 6, its periphery is provided with the characters "A. M." and "P. M." alternately arranged. Every twelve hours, therefore, the change is made from one to the other. 553 is the hour carrying disk (Figs. 17 and 30) and this carries to the A. M. and P. M. wheel.

I will now proceed to describe the elapsed time timing cams and the clock-controlled means for driving them during certain periods of time only, the cams being at rest at all other times.

*The elapsed time timing cams, their driving mechanism, the magnetic cut-out mechanism.*—These are especially illustrated in Figs. 10, 14, 15, 16, 17–27 and 32. These timing cams are 323, the tens of hours, 403 the hours, 385 the tens of minutes and 254 the minutes. These are each loosely mounted on shaft 50 and each has fast to it a ratchet and with the exception of the tens of hour cam, each has fast to it also a carrying disk and each is provided with a feeding pawl. The feeding pawl, all but the minutes, is similarly provided with a finger fast on its sleeve, having a side projection resting upon the periphery of the carrying disk of the wheel of the next lower denomination, as already described for the time-of-day cams. Each feeding pawl is also loosely mounted on rod 232 and is provided with a similar spring.

The minute cam 254 and connecting parts is shown in Fig. 18. 266 is the ratchet, 397 the carrying disk, 269 the pawl, 271 its spring. The wiper of pawl 390 (Fig. 19) is shown with a projecting arm 313 (Fig. 18). Each wiper of a higher order has such a projection extending back of the next lower actuating pawl. These lift all of the higher pawls out of mesh when the cut-out mechanism lifts the lowest pawl out of mesh. Cam 254 is shown with but one rise, and its ratchet 266 with ten teeth.

Tens of minutes cam 385 is shown in Fig. 19. It is provided with two rises with six teeth to each in its ratchet 399. 398 is its carrying disk, 390 its pawl, 392 the side projection of the next higher pawl wiper and 387 its spring.

The hour cam 403 is shown in Fig. 20 and is provided with but one rise with ten teeth in its ratchet 401. 400 is its carrying disk, 393 its pawl with its wiper 396, 392 its projection resting on the pawl of the next lower wheel and 388 is its spring. 391 is the projection from the tens of hours pawl wiper.

The tens of hours cam 323 is shown in Fig. 21. It has one rise and has ten teeth in its ratchet 451. 389 is its pawl and 386 is its spring.

In Figs. 46 and 47 I have illustrated a preferred magnetically controlled cut-out mechanism, together with circuits adapted for use therewith and for controlling a number of elapsed time indicating mechanism from a common source of power. 18 represents any conventional clock movement. 567 is a wheel adapted to be rotated every minute carrying an insulated disk 14 mounted on shaft 561 to which the wheel is also fast. Disk 14 has a single tooth. 571 is a contact arm fastened to insulated block 564 and normally pulled downwardly by spring 563 and having at its end a projection carrying a downward contact pin 569. 570 is an arm fast to insulated block 564ᵃ and normally pulled downward by spring 562. The ends of arms 570 and 571 rest against the disk 561 and as it rotates they are gradually raised. In this position of the parts contact arm 571 and pin 569 are separated. The tooth of disk 561 passes the extreme end of 571, the latter slipping downward off the tooth and making contact between 569 and 570. An instant later the end of 570 drops off the tooth again separating 569 and 570. A momentary contact is thus made every minute. When the finger of disk 561 brings contacts 569 and 570 together, it closes a circuit through magnet 15 (Fig. 47), energizing that magnet and attracting its armature 459 against the tension of spring 460. This circuit runs from contacts 569, 570, on one side through lever 571, wires 565, 566, battery 17, switch 601 adapted to be manually operated whenever desired, wire 20, magnet 15, switch lever 602, adapted to be manually operated, when desired to open the circuit permanently, wires 13, 574, lever 570 back to contact 569. Magnet 15 is thus momentarily energized every minute, closing contact between 462 and contact 459, 461 being the back stop for armature 459. This closes the circuit from common source of power 16, represented as an electric generator, through magnet 61 and 493, such as is illustrated in the mechanism of the present machine. This circuit runs from generator 16 through one side of double switch 604, wire 25, armature lever 459, contact 462, wire 21, wire 609, connecting block 10, wire 612, magnet 61 and 493, return wire 610, common wire 22, arm of switch 604 back to generator 16. The circuits are also shown for simultaneously energizing magnets 61 and 493' and 61 and 493'' through tap wires passing through connecting block 10', wire 612', back through 613' to wire 610 and with magnet 61 and 493'' through tap wires passing through connecting block 10'', wire 612'', 613'' back to common wire 610. Thus a common source of power generator 16, is made to actuate a plurality of time mechanisms like the one shown in detail herein. 606 and 607 are ordinary condensers connected with the above circuit by tap wires 23 and 24, 23' and 24' and 23'' and 24'' respectively.

From the above, it will be seen that with manual switches 601 and 602 closed, the clock movement will energize magnet 61 and 493 every minute, causing the feeding pawls of the time-of-day cams to feed those cams as already described. This provides a series of time-of-day cams actuated by magnetically operated clock-controlled means. The cams composing a series of different denominations of time are provided with carrying means for progressively carrying from one wheel of lower denomination to that of the next higher denomination. It will also be seen that these time-of-day cams are continuously driven without interruption, and by an intermittent step by step movement. This step by step movement takes place with each minute beat of the clock. Magnet 61 and 493 also similarly and intermittently feeds forward the elapsed time timing cams whenever it is operatively connected with them. The means shown for operatively connecting or disconnecting magnet 61 and 493 from their feeding pawls will now be described. This is accomplished through a magnet 523 which serves to cut in or out clutch mechanism forming part of the connection between magnet 61 and 493 and the said feeding paws. 584 is a clock driven disk provided with a series of circuit opening and closing devices adapted at predetermined times to open and close the circuit through magnet 523. Disk 584 is driven from the clockwork through shaft 581, beveled gears 580 and 582, pinion 583 meshing with teeth of disk 584 which is mounted on shaft 590. The parts are so arranged that the disk 584 is driven one revolution in twenty four hours. 595, 589, 588 and 587 are a series of insulated contacts on 584, adapted to strike the end of spring arm 586 and force contact point 637 against contact 636 on spring arm 635, momentarily making contact between 637 and 636. Spring arms 586 and 635 are mounted in insulating blocks and are normally pulled downward by the two springs 578. Insulating block 638 normally holds the spring arms apart and except when the contacts 637, 636, etc., are in contact, the circuit is broken between 596 and 597. At the moment, however, when one of the contacts 637, etc., strikes spring 636, and makes contact it closes a circuit through magnet 523 (Fig. 47) this circuit runs as follows,—from spring arm 635 through wire 596, 26, switch 600, magnet 605, wire 20, manual switch 601, battery 17, wire 566, 577, 597 to spring arm 586. This energizes magnet 605 and closes its armature 608 against the tension of its spring 603, pulling it forward from its back stop 598 and making contact with its front contact 599. This closes a circuit from common source of power 16, through magnet 523 as follows,—generator 17, one side of switch 604, wire 25, wire 643, armature 608, contact 599, wire 644, wire 611, connecting block 10, wire 614, magnet 523, wire 613, common wire 610, wire 22, the other branch of switch 604 back to generator. Magnet 523 is thereby energized and feeds forward ratchet wheel 534 one point, throwing pawl 269 of the minute elapsed time timing cam 254 into mesh with its feeding ratchet 266. Ratchet remains in mesh with its pawl and its corresponding minute elapsed time timing cam 254 is fed forward at each minute continuously from that time on, and with it of course by the carrying operation each cam of higher denomination of the elapsed time timing cams, until the next contact 588 on disk 584 makes contact with the end of spring arm 586. This again closes the circuit through magnet 605 and thus through magnet 523, again feeding forward ratchet 534 one tooth and permitting tooth 531 of lever 530 to fall into a cut-away portion of ratchet 532, removing pawl 269 from mesh with its ratchet 266. The feeding of the elapsed time timing cams thereupon ceases and these cams are at rest until the next contact 589 on disk 584 again similarly closes the circuit through magnet 605 and again brings pawl 269 into mesh with ratchet 266, where it stays until the next contact piece 595 again removes it in the same manner.

The contacts 595, 589, 588 and 587 may be arranged at any predetermined points that may be desired upon disk 584 and for this purpose are adjustable in a slot 585 in that disk. For convenience, I have shown the face of disk 584 as divided into twenty-four divisions, each one representing an hour and they are numbered to correspond with the hours of A. M. and P. M. time accordingly. In the arrangement shown in Fig. 46, 587 is arranged at 7 A. M., 588 at 12 M., 589 at 1 P. M. and 595 at 5 P. M. Accordingly, the elapsed time timing cams are driven by the clock-controlled means from 7 o'clock in the morning until 12, remain at rest until 1 o'clock, are again driven until 5 P. M. and then remain at rest until 7 o'clock on the following morning. They are thus alternately actuated or at rest for predetermined periods of time, being started and stopped at predetermined intervals. This is done by means of a magnetically controlled clutch which operatively disconnects or connects these cams to their driving means. By these means the cams form a time storing or adding device composed of a series of different denominations, the lower carrying to the higher in the ordinary manner, and adapted to add from day to day the time within the working periods of the day and not to add the time outside of those periods. By the condition of these cams at any time the total of such working times thus added is indicated and by suitable mechanism, such as that presently to be described, such indications are conveyed to type wheels and are used for the purpose of obtaining and recording the elapsed time between two operations by the same workman. By these means, such operations may be days apart and yet only a single time identification record upon a card needs to be made at the time of starting and be used at the close for causing an automatic computation to be made of the elapsed time between such starting time and the time of the closing of the job. These cams form a continuous and progressive series of indications, excluding from the computation all the times of disconnection.

In order to prevent any interference with the regular operation of the clock-controlled means, when the magnetic clutch is operated, I preferably place in the circuit of magnet 605 another set of contacts 575 and 576 (Fig. 46), which contacts are closed by the insulated disk 14 between the times when it operates the contacts 569 and 570. Arms 575 and 576 are similarly mounted on insulating blocks 579 and are provided with springs 568. Arm 575 has a projection 615 provided with a pin 552. These spring arms are arranged diametrically opposite spring arms 570 and 571 with reference to disk 14. In the same manner the contacts 575 and 576 are normally apart, but when the tooth of disk 14 passes them they are momentarily brought into contact in the same manner as described for the other contacts. In this case, the circuit through magnet 605 from spring contacts 575 and 576 passes from wire 566 through wire 327, arm 575, and arm 576, wire 249 to wire 577. Contacts 636 and 637 are thus in series with contacts 575 and 576 and both must be closed at the same time in order to energize magnet 605. As shown, this can only be done at times, when contacts 636 and 637 are operated. There can, accordingly, be no interference with the regular operation of energizing and de-energizing magnet 61 and 493 by the connecting or disconnecting of the clutch at the same point of time.

It will thus be seen that there are two separate and independent sets of timing cams, one the time-of-day timing cams, adapted to control the time-of-day recording wheels 148, 422, 424 and 365, always continuously driven by the clock-controlled means and always representing the true time; and the other the elapsed time timing cams, only driven during predetermined periods or intervals of time, but storing or adding up from day to day such time intervals and adapted to control elapsed time indicating devices, as shown, elapsed time type wheels 423, 421, 420 and 245 respectively, to cause them to move one way, the adding way, to represent a time corresponding with that represented by the then condition of the elapsed time timing cams and also controlling other time indicating devices consisting of a series of punches so as to cause the punches to punch holes in the card on an operation of the machine, the location of which holes will represent the time represented by the then condition of the elapsed time timing cams. This latter punching operation is done at the beginning of a job and a record is thus imprinted upon the card of the then condition of the timing cams. At a later operation of the machine, the holes thus punched in the card will control the movement of subtracting mechanism adapted to move the elapsed time type wheels and also the punches in the reverse or subtracting direction so as to subtract from the time represented on them, corresponding with the then condition of the elapsed time timing cams at such second or later operation, the time corresponding with the condition of these cams at the time of the first operation. This will, of course, give the elapsed time in working hours between the two operations, irrespective of whether the second operation is made during the same half of the day as the first one or the same day or days later.

I will now proceed to describe the connecting means between the time-of-day cams and the time-of-day recording type wheels.

*Connections between the time-of-day cams and the time-of-day recording type wheels.*—These are specially illustrated in Figs. 6, 8, 10, 17 and 28–31.

545 is the timing cam for the "A. M." and "P. M." type wheel 148, 554 is the timing cam for the hour type wheel 422, 551 the timing cam for the tens-of-minutes type-wheels 424 and 548 the timing cam for the minute type-wheel 365. The hour and minute and tens-of-minute type wheels stand normally at zero, that is with zero on the printing line. At each operation of the machine by handle 2 these wheels are rotated so as to bring upon the printing line the hour and minute represented by the condition of their timing cams at that moment, or in other words the type wheels are moved so as to correspond with the then condition of their timing cams. The connection from each timing cam and its type wheel is the same in each case and I will describe that connecting the minute cam 548 with the minute time-of-day wheel 365. These connections are specially illustrated in Fig. 6. In Fig. 6 the timing cam is shown as standing at the position represented by the figure 2, representing two minutes. 376 is a wiper loosely pivoted on stationary shaft 157 and having the roller 255 bearing upon the surface of cam 548. The wipers for the other cam wheels are similarly loosely pivoted on shaft 157. Spring 329 attached to rod 233 normally holds the roller against the cam surface. Wiper 376 is provided with gear teeth meshing with gear teeth 373 on sector ratchet 310 loosely mounted on shaft 159. Sector ratchet 310 has a series of ratchet teeth at its lower end. The position of sector 310 at any time will be dependent upon the position of the timing cam 548. Sector 310 is operated through driving mechanism, actuated by handle 2, having always the same extent of movement or stroke. This mechanism consists of a frame composed of two arms, 247, 247, (Fig. 8) connected by a universal bar 250, the two arms 247, 247 being mounted fast on shaft 159. 247, 247 are also connected by the small rod 248 and shaft 252 upon which is loosely mounted pawl 331. There is one of these pawls for each sector ratchet (Fig. 8), pawl 436 for the hour sector ratchet 435 and pawl 208 for the sector ratchet 207 of the A. M. and P. M. wheel. Spring 334 secured to pawl 331 and at the other end to rod 248 normally holds the pawl in engagement with the teeth of the lower end of sector ratchet 310. Similar springs (not shown) are provided for the other sector ratchets. Shaft 159 is rocked at each rocking of main shaft 32 by means of cam 169 (Fig. 3) engaging roller 170 on sector lever 161 loosely pivoted on shaft 172, the teeth on sector 161 engaging teeth on sector 160 fast on shaft 159. The roller 171 on sector 161 is for the purpose of positively returning the parts to their normal position on the return of shaft 32. Spring 173 secured to the lower end of lever 161 and to 174 keeps roller 170 in engagement with cam 169 and aids in returning the parts to their normal position.

A movement of shaft 159 rocks frame 247, carrying with it the pawls 331, 437, 436 and 208 moving them toward the left, as viewed in Fig. 6. This movement is always one of the same extent. At the extreme righthand ends of the movement the pawls strike a bar 234, rocking them and disengaging pawl point on the left hand end of the pawls from the teeth and their respective sector ratchets, as shown in Fig. 6. In all other positions of the frame 247 the springs hold the pawls in engagement with the teeth of the sector ratchet. Immediately after the commencement of the leftward movement of frame 247, during the actuation of handle 2, the pawls engage their sector ratchets and each pawl moves its corresponding sector to the left a distance corresponding with the leftward movement of the pawl. In this movement the particular ratchet tooth of the sector ratchet that its pawl will engage will depend upon the position of the sector and as previously explained this will depend upon the position of its corresponding timing cam. In the position of the parts shown in Fig. 6 pawl 331 when released from bar 234 will engage with the second tooth of ratchet sector 310 as timing cam 548 stands at its second position. Accordingly the left hand end of sector 310 will be moved to the left a distance depending upon its initial position at the moment pawl 331 engages with it. It is then moved to the left the full distance the pawl 331 is moved. In the course of its movement it will engage pin 320 on gear sector 330 loosely mounted on shaft 159 and will rotate it to the left and upward. This movement to the left is limited by the stop rod 224 with which the nose of each pawl comes into engagement. With the timing cam at zero the left hand end of sector 310 is just nine points distant from pin 320, accordingly the extent of movement of sector 330 will depend upon what tooth on sector ratchet 310 pawl 331 engages with when released and this is determined by the position of the timing cam as previously explained. This movement of the parts will rotate wiper 376, remove its roller 255 from contact with cam 548, carrying the roller entirely out of the path of the cam. In this position the timing cam can rotate for any length of time without striking the wiper and the timing cams will be unaffected by any prolongation of the recording operation and they will always represent the true time and when the wipers are returned to their original positions they and their corresponding sector ratchets will be in a position representing such true time.

Rack teeth 368 on sector 330 mesh with rack teeth 363 on time-of-day rack 354. This rack is guided by the two guide rods 221 and 223 projecting from the side frames of the machine through slots 505 and 506 in rack 354. These rods, of course, project through corresponding slots in all of the other time-of-day racks. The slots are long enough to permit rack 354 to move upward a distance corresponding to nine units and to do this in a perfectly straight line. Rack 354 is normally kept in its lowermost position by a light tension spring 364 fast at its upper end to a small pin 284 fast to the upper end of the rack, the spring at its lower end being fast to rod 177 secured in the said frames of the machine. A series of teeth 341 are cut in the opposite side of the rack and these engage with the spur gear 361 fast to minute typewheel 365, the gear typewheel being loose on shaft 181.

Each of the tens-of-minutes type-wheel 424 and the hour wheel 422 is provided with a similar pawl, sector ratchet, gear sector and time-of-day rack. Those of the tens-of-minutes wheel 424 are pawl 437, sector ratchet 434, gear sector 428 with its pin 427 and time-of-day rack. Those of the tens-hour wheel are pawl 436, sector ratchet 435, gear sector 430 with its pin 429 and time-of-day rack 433.

It will be understood, of course, that the upward movement of each time-of-day rack will depend upon the position of the corresponding time-of-day cam and the corresponding time-of-day type-wheel will be rotated a corresponding distance, bringing upon the printing line type representing the minute or hour represented by the then position of the corresponding timing cam. In this way the time-of-day type-wheels are set at the time-of-day representing the time of the operation of the machine and when the printing hammers are operated, this time is printed upon the card inserted in the slot.

Each timing cam is provided with a pawl to prevent backward rotation. That of cam 548 is pawl 325 mounted loosely on rod 158 and held by spring 326 fastened to rod 276 in engagement with the ratchet 546. The wipers for the tens-of-minutes timing cam and that of the hour timing cam are not shown but are similar to 376 (Fig. 6).

The A. M. and P. M. time-of-day wheel 148 is provided with only two type, one representing A. M. and the other P. M. The wheel is moved either so as to bring the A. M. type or the P. M. type upon the printing line and this is done by means of cam 545. This cam is illustrated in Fig. 31 and as there shown has six rises and six depressions. The connections between it and wheel 148 are similar to those already described for the hour and minute type wheels, and which will therefore not be further described. Cam 545 is fed forward one tooth at the end of each twelve hours. If the cam is on a rise its sector gear will move upward one point, shifting the A. M. type, which is normally on the printing line of wheel 148, off that line and bringing the P. M. type upon the line. If the wiper is in a depression of cam 545 the corresponding sector will not be moved at all.

It will be understood from the above that the A. M. and P. M. type-wheel will always have upon the printing line type representing either one or the other of these abbreviations; also that at every operation of the handle 2 the hour, tens-of-minutes and the minute type-wheels will be removed from their zero or normal position to a position that will bring upon the printing line type representing the then position of their corresponding time-of-day timing cams, or in other words, type representing the time-of-day of the operation of the machine. This takes place at every operation of the machine and the time is printed upon the card either as "in" time in the "in" space 620 of the card or as "out" time in the "out" space 621 of the card.

I will now proceed to describe the particular mechanism shown by which the elapsed type-wheels are moved in one direction in accordance with the position of the elapsed time timing cams at such operation.

*The elapsed time type-wheels and their connection with the elapsed time timing cams.*—These are specially illustrated in Figs. 4, 5, 8, 9, 10, 17–27 and 36. There are four elapsed time type-wheels, 245 the minutes (Fig. 8), 420 the tens-of-minutes, 421 the hours and 423 the tens-of-hours. These wheels are capable of printing up to ninety-nine hours and fifty-nine minutes. They stand normally at zero and are moved, upon the operation of handle 2 to a position to correspond with the condition at that time of their corresponding timing cams. These timing cams are shown in Fig. 17 and are 254 for the minutes, 385 for the tens-of-minutes, 403 for the hours and 323 for the tens-of-hours. These timing cams are moved only within certain stated intervals, namely the working hours of each day as has been already fully described. The position of these cams progresses from day to day, or in other words, the time of the working hours is added upon them from day to day until their limit of ninety-nine hours and fifty-nine minutes is reached. Of course, by increasing the number of these wheels the machine is capable of indefinite expansion in its elapsed time indicating capacity. At the turn of the handle 2 these elapsed time type-wheels are moved one way to correspond with the then condition of their timing cams and this would bring them so as to represent the total of the time indicated by the condition of those wheels. At the "in" operation of the machine the wheels are thus moved but no record is made as the printing device is then out of operative connection as will be presently described. But at an "out" operation of the machine the elapsed time type-wheels are moved in this way or in their adding direction according to the position of their cams and are moved the reverse way by the subtracting devices, presently to be described, which move them in this reverse or subtracting direction a distance corresponding with a prior condition of the elapsed time timing cams, namely their condition at the first or "in" operation of the machine by the same workman. I will first describe the adding movement of these type wheels.

The connection between the elapsed time timing cams and the elapsed time type-wheels resembles in many respects that between a time of day timing cam and its type-wheel. The connection between each elapsed time timing cam and its type wheel is the same as between any other elapsed time timing cam and its type-wheel. Figs. 4 and 5 illustrate these connections for the minute type wheel 245 and its timing cam 254. Fig. 4 showing the parts before the operation by handle 2 and Fig. 5 showing the parts in the recording position. Referring to the minute indicating mechanism, 256 is the wiper provided with teeth 471 loosely pivoted on shaft 157 and provided with roller 255 and held upwardly by spring 275. 246 is the sector ratchet with teeth 472 meshing with teeth 471. 246 has a series of teeth 473 on its lower end with which pawl 251 engages when free from rod 234 as already described. 176 is a gear sector and 272 its pin and 474 its gear teeth meshing with gear teeth 475 on rack 235. 506 and 505 are the slots of this rack through which pass rods 221 and 223 and 265 is its spring. The operation of these parts is exactly the same as that described in the case of the time-of-day mechanism and the height to which rack 235 will be lifted at any operation of the machine will be dependent upon the position of the corresponding timing cam. 467 are teeth cut in the lower opposite edge of rack 235 and these teeth engage with a floating pinion or differential gear wheel 238. This differential also meshes with another rack 205 which is used for subtracting purposes as will be presently described. This subtracting rack 205 is similarly mounted, being provided with slots 507 and 508 through which pass guide rods 218 and 222. Of course, a differential gear and a subtracting rack are provided for each type-wheel. The differential gear-wheel for the tens-of-minutes type-wheel is 476 and its subtracting rack is 279. The differential gear for the hour type-wheel is 482 and its subtracting rack 280 and the differential gear for the tens-of-hours type-wheel is 485 and its subtracting rack is 332 (Fig. 9). Secured to each of these differential gears is a differential rack. The racks are numbered 220, 281, 282 and 283 respectively (Fig. 8). The particular differential gear and rack shown in Fig. 36 are the minutes differential gear 238 provided with teeth 309 and rack 220. The others are constructed in exactly the same manner except only as to the borrowing mechanism which will be described later on. The rack 220 is provided at its lower end with a slight offset into which a shouldered stud 417 is driven. Mounted freely on this stud is the minute differential 238. The cover plate 416, also provided with an offset, is riveted to the rack by rivet 419. Both the rack itself and the cover plate 416 are provided with outwardly extending ears 479, between which the minutes subtracting rack 205 and the minutes rack 235 work freely. This construction keeps the differential gear firmly in mesh with both of these racks at all times.

A hole 418 is drilled through the center of stud 417 to receive the rivet 239 by which the lever 237 is attached to the rack 220. This lever 237 is shown in Fig. 4 and Fig. 5. The purpose of these levers and the corresponding levers 340, 339 and 306 of the tens-of minutes, hours and tens of hours mechanism is to exert a strong downward pull on the differential racks 220, 281, 282 and 283 respectively. For this purpose a tension spring is provided for each lever, that for lever 237 is numbered 229 and is shown in Fig. 4 and is fastened to rod 180 as are the other tension springs. In the normal position of these parts the elapsed time type-wheels stand at zero, the time-of-day racks 235, etc., are in their lowermost position, the subtracting racks 205, etc., are in their highest position and the differential racks stand at the zero position.

The differential racks 220, 281, 282 and 283 are each provided with a series of teeth 480 meshing with its corresponding type-wheel. Each type-wheel and its pinion are loose on shaft 181. Accordingly as a differential gear and its rack rise or fall, its corresponding type wheel will be rotated one way or the other. The type on the type-wheel are so arranged that as the differential rack rises it will tend to add on the wheel, that is to rotate it from zero upward.

219 is a guide bar for holding the differential racks in proper alinement and for that purpose passes through a slot in each rack.

The pawls for operating the sector ratchets of the elapsed time type mechanism are mounted on rod 252 of frame 247 just as are the pawls of the time-of-day mechanism already described and they are provided each with a spring 253 fastened to rod 248 and are moved out of mesh with their sector ratchets by the pawls striking the rod 234 when the parts are in their normal or zero position. These parts for the various sector ratchets and also the gear sectors and ratchets, differentials and differential racks are as follows: For the minute sector ratchet 246 they are pawl 251 and its spring 253, sector ratchet 246, gear sector 176 with pin 272 and gear teeth 474, rack 235 with teeth 475 and 467, the spring 265, slots 505 and 506, differentials 238 and differential rack 220. For the tens-of-minute sector ratchet they are pawl 443, sector ratchet 440, gear sector 355 with its pin 357, rack 359, differential 476, subtractor rack 279. Those for the hour sector ratchet 441 are as follows: pawl 444, sector ratchet 441, gear sector 356 with its pin 358, rack 360, differential 482, subtractor rack 280. Those for the tens-of-hours sector gear 442 are pawl 445, sector gear 442, gear sector 328 with its pin 327, rack 314, differential gear 485, and subtractor rack 332. Frame 247 and the pawls for these various mechanisms will operate in the same way, as previously described in the time-of-day mechanism, to force the sector ratchets 246, 440, 441 and 442 to the left, as viewed in Fig. 4, until they strike the pins on the gear sectors 176, 355, 356 and 328 respectively, causing the teeth of each gear sector to mesh respectively with the teeth of the racks 235, 359, 360 and 314, rotating and raising the differentials 238, 476, 482 and 485, thus rotating the elapsed time type-wheels 245, 420, 421 and 423 respectively. Each type-wheel will be rotated to an extent corresponding with the position of its respective elapsed time timing cam so that there will be brought upon the printing line opposite the elapsed time printing hammer 137 type representing respectively the minute or tens-of-minutes or hour or tens-of-hours represented by the then position of the respective elapsed time timing cams 254, 385, 403 and 323 respectively. In other words, the type thus brought upon the printing line will represent the time of the operation of the machine. During this operation the wipers are entirely removed from the path of the timing cams so that any length of time may be consumed in the printing operation without interfering with the continued rotation of the timing cams under the impulse of their time-controlled driving mechanism.

Fig. 4 illustrates one of the elapsed time type-wheels and its train of operating mechanism, in the position they occupy when the machine is not being operated, at which time the type wheel is at zero. Fig. 5 illustrates the mechanism after handle 2 has been operated and when the parts are in the recording position.

The above description of the movement of the differentials and the elapsed time type-wheels has, for purposes of clearness, been given as if the subtractor racks 205, 279, 280 and 332 had meanwhile been standing still, in which case the differential under the influence of the racks 235, 359, 360 and 314 would be moved upward, rotating the elapsed time type-wheels as described, the differentials rolling up on the subtractor racks. As a matter of fact in the elapsed time operation of the machine, as shown, the subtractor racks are falling at the same time as the racks 235, etc., are rising. If the downward movement of the subtractor racks 205 is at the same rate as the upward movement of the racks 235, etc., the differential will simply rotate without rising or falling until one or the other of the racks has stopped, whereupon the other rack in the rest of this movement will move the differential upward or downward as the case may be, the resultant of the two movements being alone what affects the movement of the differentials. It is immaterial in what order these upward and downward movements take place, whether simultaneously as shown or at the same rate if simultaneously, or whether successively. The result is the same in each case as will clearly appear when the subtractor racks are fully described hereafter. Before describing the subtractor racks, however, I will first describe the means for selecting the proper punches and for punching the time identification marks on the card in accordance with the time of a first or "in" operation of the machine, which identification marks or holes in the card will at a later or second operation of the machine by the same workman, control the extent of the downward movement of the subtracting racks.

*The punching devices and their connections and operating means.*—These are specially illustrated in Figs. 3, 4, 5, 8–10 and 36–45. In my improved machine a record of the time of operation of the machine and of the elapsed time between two operations by the same workman is also made by punching holes or marks in a card. Such marks or holes in a first or "in" operation of the machine constitute time identification marks indicating by their location upon the card the time of the operation of the machine and also serving to control the elapsed time indicating mechanism of the machine on a second or subsequent operation by the same operator. On a second or "out" operation of the machine the marks or holes punched represent by their location on the card the elapsed time between that operation and an earlier one by the same operator. Such a punched elapsed time record is valuable as a check upon the printed elapsed time record, serving to indicate visually to the eye by the location of the punched hole or mark such elapsed time. To aid in the reading or understanding of such indication a scale may, if desired, be employed upon the card, as shown for example in Fig. 45. Such punched hole or holes may also be of use in the totaling of the elapsed times of workmen in a shop or factory. Thus the cards of any number of workmen punched with marks or holes representing elapsed time between two operations, such as are shown in Fig. 43 and by holes 591—594 may be passed through any suitable integrating machine adapted for the purpose and the sum total of all elapsed times represented by the punched holes of the cards may be readily and automatically obtained.

Any suitable punching mechanism may be employed. I preferably provide a plurality of punching devices representing different denominations of time. In the machine shown, the punching devices are represented by a series of punches for each denomination, each series having a punch selector for selecting the particular punch in each series to be operated. Of course it will be understood that a single punch for each series, movable in accordance with the operation of the machine, would be a full equivalent for the series of punches and their punch selectors. I also preferably use but one set of punching devices for punching the "in" time at the first operation and the elapsed time at a second operation, although of course separate sets of punching devices may be used if desired.

For convenience and simplicity I prefer to connect the punching devices directly with the differentials, although any other suitable means may be used for operating or controlling them. In this way each differential controls its punching device in the same manner as it controls its elapsed time type-wheel. Thus on an "in" operation of the machine, the differential is in effect controlled only by the timing cams and represents by the position to which it is moved the condition of such timing cams at the time of such "in" operation. The differential through its connection moves its elapsed time type-wheel and also its punching devices to cause them to move into a position to represent the time of such "in" operation. Accordingly at a first or "in" operation of the machine the elapsed time printing mechanism prints and the punching devices punch in accordance with the time of that "in" operation.

Upon a second or "out" operation the differentials are controlled both by the timing cam one way or in the adding way, and by the subtracting racks the reverse or the subtracting way, and they occupy a resultant position representing the elapsed time between such second or "out" operation and an earlier or "in" operation by the same workman. The differentials in this operation accordingly move the elapsed time type wheels and the punching devices into a position to represent such elapsed time and upon the complete operation of the machine the type wheels print the elapsed time and the punching wheels punch holes representing that time.

It will be observed that the same operating or controlling means are provided for both the elapsed time printing mechanism and the punching devices, namely, the clock-controlled timing cams and the subtracting racks themselves controlled by time identification holes upon a card representing a first or "in" operation, and both the timing cams and subtracting racks acting through the differentials to control the elapsed time timing wheels and punching devices.

Four series or sets of punches 122 are shown in Fig. 10. Fig. 3 shows the minute series. In the mechanism shown there are ten punches for the minutes, six for the tens-of-minutes, ten for the hours and ten for the tens-of-hours. There are four punch selectors, one for each series of punches, 144 for the minutes, 349 for the tens-of-minutes, 348 for the hours and 162 for the tens-of-hours. Each punch selector is controlled by its differential by mechanism presently to be described.

Referring to the punch mechanism as shown in Fig. 3, the punches 122 are steel rods mounted in two guide plates 146 and 9, and each is fitted with a collar 123. The punches work easily in the guide plates. A die plate 125 (Fig. 3) is arranged at one side of the card slots 1 and 1ᵃ, supported on brackets 121 and 129 screwed to the side frame. The die plate 125 is provided with holes registering with those in the guide or stripper plate 9. The holes opposite the punches correspond in number to the punches in each series. Levers 124 are provided in order to return the punches to their normal position. These are operated by the punch operating mechanism presently to be described.

The particular connections shown between the differentials and the punching devices are as follows. As the connection between each differential and its punching device is the same, I will describe the connection between the minute differential and its punching device. Secured to the minute differential 238 is a dependent rod 498 with a foot 47. Secured to this foot is a cross-over bar 486, secured at its other end to the foot of a rack 446. This rack has teeth 509 which mesh with small pinion 114, fast to gear 447, both being loose on shaft 111. Gear 447 meshes with the teeth 484 of punch selector 144. The latter is provided at its upper end with two fingers 503 and 504 for pushing inward the punches 122. 499 is a slot in punch selector 144 through which passes rod 439 for guiding the selector. At its upper end selector 144 is bent over to form a horizontal projection 515 provided with an opening through which passes rod 71 fast in frame 338. This serves also to guide the punch selector. Small pinion 114 and gear 447 are proportioned so as to double the movement of the punching rack to make it correspond to the movement of the racks for the elapsed time type wheels. 645 is a stop over for holding the rack 446 and the other corresponding racks in engagement with the pinions of their respective gear wheels. Rod 439 passes through similar slots in the other punch selectors. From the above it will be seen that the minute punch selector 144 moves upward and downward in accordance with the movement of its differential 238. As this movement may be above or below zero it is necessary to provide the two punch fingers 503, 504, one only of them being operated at any one time. The other punch selectors are numbered as follows. The tens-of-minutes 349, the hours 348 and the tens-of-hours 162. Each of these is connected with its corresponding differential by a somewhat similar cross-over arrangement, rack, pinion and gear. The tens-of minutes connections consist of dependent rod 494, double cross-overs 257 and 487 connected by arm 489, and rack 455, pinion 116 and gear 351. The connections for the hours punch selector is as follows: dependent rod 491, double cross overs 258 and 488 connected by arm 490, rack 596, pinion 117 and gear 350. The connection for the tens-of-hours punch selector 162 are as follows: dependent rod 449, cross over 259, arm 492, rack 558, pinion 119 and gear 167.

Normally the punch selectors stand at their mid position, as shown in Fig. 3, with the top fingers opposite the highest punch in the corresponding series of punches. This is the zero position. If the corresponding differential is moved to the position representing 5 the corresponding punch selector will be moved in accordance therewith and one of the fingers will stand opposite the sixth punch (counting from the top) which represents the fifth unit of the series. When the punches are operated, as presently to be described, this sixth punch will punch a hole in the card. In the first operation of the machine this will be in the space of the card in the column headed "Working time" and on a second or "out" operation this hole will be in the part 573 of the card.

The reason for providing a system of cross-overs is to permit the punches to be arranged for the various denominations of time, facing in the same order as that of the elapsed time type wheels. This permits the card to be put into the slot facing always in the same direction, whether the operation be an "in" or an "out" operation.

I preferably make each selector of one piece of metal. In order to keep them in proper alinement with the punches, each punch selector is bent over at the top at right angles and through a hole in such bent over part passes a vertical rod. These are shown clearly in Fig. 40. The four rods are 80, 79, 78 and 71. They are fastened in the bent metal piece 70. The bent over tops of the respective selectors are 518, 517, 516 and 515 respectively.

The means shown for operating the punch selectors are as follows: A shaft 174 extends across the machine and is fast in both side frames 66 and 68. Loosely mounted on this shaft are the two upright levers 338 (see Figs. 3, 8, 9, and 10.) Extending between them at their upper ends and rigidly connected to them is a punch operating plate 170 against which abut the rear projections of the punch selectors and held in a rearward position by spring 156. Operating plate 70 is given a forward and backward movement by the operation of handle 2, as will be presently described, and this forces the punch selectors forward so that the nose of each selector strikes its appropriate punch 122 and forces it through any card that may be in the slot. To force plate 70 to the left, as viewed in Fig. 3, I preferably employ a toggle-lever arrangement, of which 153 is one part and 151 is the other. Part 153 consists of two arms, each pivoted at 155, to each of the upright levers 338. Part 151 consists of two arms freely pivoted on shaft 50 and at their other ends pivoted at 457 to the arms 153. This whole arrangement constitutes a toggle frame for forcing plate 70 forward. The toggle is operated through a link 143 secured to part 151 at 152. Link 143 is secured at its lower end 139 to arm 138 which operates the printing mechanism which will be presently described. At every operation of handle 2, arm 138 is rotated to the left and downward, as viewed in Fig. 3, pulling link 143 downward, straightening out the toggle, forcing plate 70 and the heads of the punch selectors to the left and driving those punches that stand opposite the noses of the selectors through the card, punching the time identification holes therein. Arm 138 is loose on shaft 182 and has at one end a cam roller 163 bearing upon the face of cam 168 fast on main shaft 32. Toward the end of the forward movement of main shaft 32, cam 168 rocks lever 138.

Levers 124 are operated in unison with plate 70 by means of a link 164 pivoted at 165 to one of the levers 338 and pivoted at its other end to one of the levers 124. Levers 124 are fast to shaft 202 loosely mounted in the side frames of the machine. The function of levers 124 is to press against collars 123 in the return movement and to return the punches to their original position.

On a first or "in" operation of a machine by a workman the punches will be operated and holes will be punched in the card indicating by their location thereon the time of such operation. At the same time the time-of-day type-wheels will be moved to position in accordance with the time-of-day cams representing the true time and they will print upon the card that time. In this operation the differentials and the elapsed time type-wheels will be moved in the adding direction in accordance with the then condition of the elapsed time timing cams and the subtracting racks will fall their entire distance. This movement of the differential and the elapsed time type-wheels and the subtracting racks will not accomplish any work, so far as the printing is concerned, however, as the printing hammer opposite the elapsed time type-wheels will in this position of the parts be inoperative as will be presently described. It will, however, cause the punch selectors to be moved to position, which position will be in accordance with the position of the cams at the time of operation.

On the "out" or second operation of the machine by a workman, as at the completion of a job, he takes his card, upon which at the first operation of the machine by him there had been printed the "in" time or the time of the commencement of the job in the "in" space 620 on the card and in which card at the same time there had been punched the four time identification holes 619, 618, 617 and 616 representing the same time in tens-of-hours, hours, tens-of-minutes and minutes as were then represented by the then condition of the corresponding elapsed time timing cams, and inserts it in the "out" slot. This brings the card a little to the left of its former position, when in the "in" slot, and so that space 573 of the card is now opposite the punches 122 and so that the time identification holes 619—616 are now opposite identifying devices, which in the form shown are series of pins 209 (Fig. 4), 377 (Fig. 11), 378 (Fig. 13), representing respectively the pins for the minutes, hours and tens of minutes. The tens-of-hours denomination pins are not shown but are like 209. The workman then pulls forward handle 2 as before. As before this causes the time-of-day type-wheels to be moved to a position corresponding with the position of their time-of-day cams so that there will stand upon the printing line type representing the time of the second or "out" operation. It also causes the differentials and the elapsed time type-wheels and punching devices to be moved in their adding direction to a position to correspond with the then condition or position of the elapsed time timing cams. It also, near the commencement of the movement of handle 2, causes the pin boxes with the four sets of pins to be moved forward so that each series of pins is brought into contact with the card, whereupon the pins in register with the time identification holes previously punched in the card, will pass through such holes and project into the paths of the corresponding subtracting racks. It will also release the subtracting racks and permit them to fall, thus moving the differentials in the reverse or subtracting direction and moving the elapsed time type-wheels and punching selectors in the reverse or subtracting direction. These subtracting racks, however, instead of falling their entire distance, as in the first or "in" operation, will fall only until stopped by the four projecting pins. As these pins are projecting through the time identification holes, whose location upon the card corresponded with the condition of the elapsed time timing cams at the first or "in" operation of the machine by the workman, the movement of each subtracting rack will depend in its extent upon the then condition of the elapsed time timing cams, i. e. the condition of the timing cams at the time of the first operation, and thus the subtracting racks will move the differentials and the elapsed time type-wheels and punch selectors in the reverse or subtracting direction a distance corresponding to the time represented by the condition of the elapsed time timing cams at the first or "in" operation, or in other words, will subtract the time of such "in" operation as thus represented from the time of the "out" operation as represented by the condition of the elapsed time timing cams at the second operation. This will cause to be brought upon the printing line of the elapsed time type-wheels type representing the difference in working hours between the first operation and the second operation, or in other words, the elapsed time in working hours between the said operations and will select the punches representing such elapsed time. The further operation of the handle will cause the printing of this time upon the card in the space 622 and will cause the printing of the time of the second or "out" operation in the space 621 of the card. It will also cause the punching of the elapsed time in column 573 of the card. Holes 591–594 represent such time.

I will now describe in detail the subtracting mechanism including the sets of identifying pins for controlling the subtracting mechanism.

*The subtracting mechanism including the identifying pins, subtractor racks and connections.*—These are specially illustrated in Figs. 4, 5, 8, 9, 10, 11, 12, and 13. The differentials and through them the elapsed time-wheels and punch selectors are controlled in their reverse or subtracting movement by means of records of a previous operation of the machine as marked upon the card, these records, as shown in the particular machine illustrated, being in the form of time identification holes punched in the card. This control, in the machine shown, is effected through pin boxes, each comprising a series of pins representing different units of a denomination of time, which boxes are mounted so as to be moved toward and away from the card, so that any pin corresponding or registering with a hole in the card will project through it into the path of one of the subtractor racks and thereby influence the extent of movement of that rack and thereby effect the extent of the subtracting movement imparted to the corresponding differential, type-wheel and punch selector.

Referring now to the specific mechanism shown, a pin box is arranged for each row of holes punched in the record card. One of these pin boxes is shown in Figs. 4 and 5. As all the pin boxes and their connecting mechanism are substantially the same, I will describe the one shown in Figs. 4 and 5, viz., the minute pin box, in detail, it being understood that a similar pin box is provided for the tens-of-minutes, another for the hours and another for the tens-of-hours.

Referring to the minutes pin box, it is mounted at the top of a movable lever 203 loosely mounted on a rod 175 fast in the side frames of the machine. This lever carries at its upper end two struts 211 and 212, and together form a frame or box to hold the pins 209. There are ten of these pins and each one of them provided with a collar 261 and a compression spring 210. The normal position of the parts is that shown in Fig. 4. The supporting levers for the other pin boxes are 346 for the tens-of-minutes, 347 for the hours and 292 for the tens-of-hours. These pin boxes and their levers are adapted to be moved toward and away from the card in the slots 1 and 1ª. The mechanism for this purpose consists of a piece 214, loosely mounted upon rod 175 and fast with an arm 227, carrying at its other end a cam roller 228 bearing upon the surface of cam 230 fast on shaft 32. Piece 214 is provided at its upper end with a rod 213, which passes through an aperture in all of the pin boxes supporting levers 203, 346, 347 and 292. Piece 214 and 227 are connected by a bushing on rod 175 (Fig. 9) to which bushing both of them are secured. The parts are shown in their normal position in Fig. 4. It will be seen that the first movement of shaft 32 and cam 230 will cause piece 214 to be moved toward the right, as viewed in Fig. 4 and through rod 213 it will move all of the pin boxes to the right against any card that may be in the card slot. This position of the parts is shown in Fig. 5.

In the first operation of the machine, in which an unpunched card has been inserted in the slot 1ª, the pins will be stopped by the card and will not pass through the openings 337 in the guide plate 9 (Fig. 45). Accordingly in this operation the pins will simply rest idly against the card and will do no work. But in a second operation by the workman, where a card is inserted which has had holes punched in it in a previous operation, those pins which register with the punched holes in the card will pass through such holes and through the corresponding holes in guide plate 9 and will project beyond it as shown in Figs. 5, 11 and 12. In this position they will lie in the path of a shoulder or shelf 206 of the corresponding subtractor rack. In Fig. 5 the shoulder 206 of the minute subtractor rack 205 is shown as stopped by resting upon the work next to the lowest pin 209.

As previously stated a subtractor rack is provided for each of the elapsed time type-wheels, the rack for the minute type-wheel being 205, that for the tens-of-minutes being 279, that for the hours 280 and for the tens-of-hours 332 (Fig. 10). These racks in their normal or zero position are at the upper end of their stroke as shown in Fig. 4. Each rack is provided with a set of gear teeth 481, see Fig. 4, which mesh with a corresponding differential gear, the set shown in Fig. 4 meshing with differential gear 238. The differential gears are as follows: (see Fig. 9) 238 for the minutes, 476 for the tens-of-minutes, 482 for the hours and 485 for the tens-of-hours. Each subtractor rack is provided with two vertical slots 507 and 508 and through all of these pass guide rods 218 and 222 secured to the side frames of the machine to guide the subtractor racks in their vertical movement and to limit that movement.

The subtractor racks are normally in their uppermost position. At each operation of the machine they are permitted to drop the entire length of the slots 507 and 508, by devices presently to be described, unless it should strike a pin 209 projecting through a hole in the card. In this downward movement they turn the differential gears 238, etc., to the left as viewed in Fig. 4 and tend to cause those gears to roll downward on the teeth 467 of racks 235, 359, 360 and 314 respectively. This motion is imparted through the differential racks 220, 281, 282, and 283 respectively through pinions 244, 361, 362 and 333 fast to the elapsed time type-wheels 245, 420, 421 and 423 respectively, causing those wheels to be moved clockwise as viewed in Fig. 4. This movement is also imparted from the differentials to the punch selectors through the dependent rods, cross-overs, etc., already described causing the punch selectors to be moved upward.

If no pins are projecting into the paths of the subtractor racks, as in a first operation of the machine, this movement will turn the differentials and elapsed time type-wheels one-half a revolution and move the punch selectors a distance equal to a full set of punches and as two complete sets of type are arranged on the periphery of each of these type-wheels and two punching fingers are provided on each selector, this downward movement of the subtractor racks has the effect of simply bringing exactly the same type upon the reverse side of the wheel onto the printing line, thus not affecting the type on the printing line in any way and of substituting one punch finger for the other without affecting the selection of any particular punch. Such movement of the subtractor racks in the first or "in" operation of the machine accordingly does no useful work whatever. But where, as is always the case on a second or "out" operation, a pin projects through the card into the path of the shoulder of the corresponding subtractor rack, it will limit the downward movement of such rack to an extent representing the time represented by the particular hole in the card through which such pin projects. This will move the corresponding differential, type-wheel and punch selector in a direction reverse to that in which they were moved by their corresponding rack 235, etc., and thus subtract from the total or added time represented by the position of the differential, type-wheel and punch selector as moved through rack 235, the number of units of the same subdivision of time represented by the corresponding hole in the time card, the effect being to bring upon the printing line that type of the elapsed time type-wheel and to make effective that punch which represents the difference in that denomination of time between the condition of the corresponding timing cam at the second operation and its condition at the first operation. This type and punch will, therefore, represent the elapsed time between the two conditions of the timing cams and this time will be printed and punched upon the time card toward the close of the second operation of the machine.

In their normal position the differential gears 238, etc., are standing at the neutral or zero position. The movement of the racks 235, etc., controlled by the position of the timing cams at the second operation will tend to cause the differential gears and their differential racks to move upward a corresponding distance and to rotate their elapsed time type-wheels and move their punch selector downward in the adding direction a corresponding distance and therefore, to cause them to represent the then condition of the timing cams, i. e. their condition at the second operation, and the subsequent operation of the subtractor racks 205, etc., in their subtracting operation will tend to cause the differential gears and their racks to move downwardly a distance corresponding with the holes punched in the card, or in other words, to move downwardly a distance corresponding with the condition of the elapsed time timing cams at the first operation of the machine. This will, of course, tend to move the type wheels backward and the punch selectors downward or in the subtracting direction a corresponding distance. The resultant condition of the respective type-wheels and punch selectors will then represent the elapsed time between the two operations, as represented by the difference between the two conditions of the elapsed time timing cams. As these timing cams are not driven all of the time, as has been already described, but are driven only during certain specified intervals, viz. intervals of working time, the elapsed time will represent not the actual time that has elapsed between the time of the first operation and the time of the second operation, but will represent the elapsed time of the working hours between those two periods of time.

In the operation of the machine shown, the adding operation and the subtracting operation are performed upon the differentials and the elapsed time type-wheels and punch selectors simultaneously. If desired the two operations may take place successively. But in either case, it will be understood, the effect of the operation upon the differential gears and their elapsed time type-wheels and punch selectors will be the same. When as in the present case, the two operations occur simultaneously, any differential gear will remain stationary until either the upward movement of its adding rack or the downward movement of its subtracting rack has been concluded and it will then be moved upward or downward during the remaining movement of the other part. It will be seen that the result is the same whether these two operations of adding and subtracting are performed successively or simultaneously. In case any differential gear goes below its normal or zero position it will, of course, be necessary to borrow one from the elapsed time type-wheel of the next higher order. The mechanism for performing this will be presently described.

In order to keep roller 228 and arm 227 in contact with cam 230, a tension spring 226 is attached to piece 214 and at its other end to the frame work.

In order to permit the subtractor racks 205, etc., to fall at the proper time and at other times to be held in their proper position, I provide a lever connected with the differential gears, loosely mounted on shaft 172 and normally held in its upper position by a rod 264. In Fig. 4 this lever for the minute differential is 237. It is fastened by rivet 239 to that differential, a slot 240 being provided to permit of the free movement of the parts. The same parts for the other differential gears are as follows: viz., for the tens-of-minutes differential, 476, lever 340; for the hour differential 482, lever 339 and for tens-of-hours differential 485, lever 306. All of these levers are loosely mounted on shaft 172 and are held in their normal position by rod 264. Rod 264 is secured to lever 262. A spring 229 is secured to lever 237 and corresponding springs (not shown) are secured to the other corresponding levers respectively. These springs 229 are secured at their other end to tie rod 180. The purpose of these springs is to exert a strong downward pull on the levers and upon their corresponding differential gears and racks. As soon as the machine starts, cam 231 rotates and allows roller 263 on the other arm of lever 262 to move inward toward shaft 32. This permits bell crank lever 262 to turn on its shaft and allows the universal bar 264 to move downward and, therefore, permits the tension springs 229, etc., to tend to pull the differential gears and their racks downward. The other end of bar 264 is attached to lever 342 (Fig. 9) loosely pivoted on shaft 172. Thus while the addition is taking place upon the elapsed time type-wheels, rod 264 is being lowered and the differential gears and their racks are free to move downward under the weight of the subtractor racks and under the influence of springs 229, etc. The subtractor racks are moved downward by their own weight, assisted by the springs 229, etc., and in its downward movement they tend to carry with them the differential gears, the latter rolling down on the adding racks, 235, etc., which latter are, of course, held in their position through their connections. Accordingly the subtracting racks move downward until stopped by pins or until they reach the limit of their downward movement, tending to take the differential gears and racks down with them and causing a subtracting operation to be performed upon the type-wheels and punch selectors.

Whenever a differential gear is dropped below its normal or zero position and the corresponding type-wheel has been rotated back of its normal or zero position, one must be borrowed from the type-wheel of the next higher order. Any suitable borrowing devices may be employed. I will now proceed to describe the device employed for this purpose.

In order to permit the borrowing operation to take place I preferably cause the pin boxes, after they have been moved forward against the card in the first part of the operation of the machine, and after the subtractor racks have fallen and have been caught by the projecting pins, to move backward slightly so as to remove the projecting pin from contact with the projection 206 (see Fig. 11) with which it is engaged in order to permit the subtractor rack to move one point downward. I also provide each subtractor rack of a denomination higher than the lowest, namely the subtractor racks for the tens-of-minutes, hours and tens-of-hours, with a projection or notch of shelf 374, as shown in Figs. 11 and 12. This shelf is made to the left and one point higher than shelf 206. Accordingly, when the pin box is moved slightly backward, the projecting pin will clear shelf 206 permitting the rack to fall farther but it will still lie in the path of shelf 374 and permit the subtractor rack to fall but one point farther. Accordingly the subtractor rack falls this additional point and rotates the differential gear and its elapsed time type-wheel one point farther in the subtracting operation thus borrowing one from such type-wheel and punch selector. In the devices shown this is accomplished by the following mechanism. Cam 230 is slightly cut away at its right hand end, as viewed in Fig. 4, and a light spring 225 is secured to each pin box support, 203, etc. Accordingly after the subtracting racks have fallen and been stopped by the pins engaging shoulders 206, roller 228 will go forward slightly in the cut away part of cam 230, permitting piece 214 to slightly fall back to the left, as viewed in Fig. 4, carrying with it rod 213. This permits those of the pin supporting levers 203, etc., which are not held in their forward position by means to be described, to go back a short distance sufficient to enable the pins to clear the first shelf 206 and to lie in the path of the second shelf 374.

To prevent those of the pin boxes from going backward where borrowing is not desired, I provide a series of catch levers to hold them in their forward position. The catch lever for tens-of-minutes support 346 is shown in Fig. 5 as 268 loosely mounted on rod 217. Similar catch levers are provided for the other supports, (see Fig. 9) 509 for the hours, and 468 for the tens-of-hours, each adapted to catch the pin box support of the next higher column. Each catch is adapted to engage and catch 243, 502 and 510 respectively, secured to the corresponding pin box support, see also Figs. 5, 11 and 12. A light spring tends to hold these catches in engagement. These springs are numbered 242 (Fig. 5) and 520 (Fig. 11). When the pin box supports are moved forward, as they are in the first part of the operation, and as viewed in Figs. 5 and 11, these catches engage and hold the supports and their pin boxes to the right.

Whenever any differential gear falls below the normal or zero position, the corresponding catch is released. This is accomplished by means of a pin projecting from the differential gear support 479 of the differential adapted to engage the cam surface at the right hand lower end of the latch. In Fig. 11 the pin is shown as 402 and the cam surface as 521. Spring 242 and the other springs are secured to a rod 215. The corresponding parts for the different cam supports are as follows: for tens-of-minutes pin box support 346, catch 243, catch lever 268 with its spring 242, cam surface 241, and differential pin 273 of the minutes differential support for hour pin box support, catch 502, catch lever 509, with its spring, and cam surface, and differential pin 341 of the tens-of-minutes differential support, tens-of-hours support 292 with its catch 510, catch lever 468 with its spring 520 and cam surface 521, and differential pin 469 on the hour differential support.

When any differential goes below its zero position its pin will tip the corresponding lever and release the corresponding catches and the pin support will fall backward slightly to the left. In order to permit this slight backward movement of one or more of the pin supports while the others are still held in their forward or right hand position as viewed in Fig. 5, the opening in the pin box supports, through which rod 213 passes, is made slightly larger than the rod, as shown in Figs. 11 and 12. Fig. 11 illustrates the catches in position and Fig. 12 illustrates them as released with the pin box in its operating position. In the latter operation one is borrowed from the type-wheel or punch selector of the next higher order. It will be understood that each differential pin affects only the lever and pin box support of the next higher order. Of course, on the lowest or tenth subtractor rack only one notch is provided as shown in Fig. 5. The slot in the pin supports is only just large enough to permit the pin supports to fall backward just enough to permit the projecting pin to clear the lower shelf 206 but not enough to permit it to clear the upper shelf 374 of its subtractor rack.

As the pin boxes go forward on the first movement the catch levers 268, 509 and 468 are moved into operative or catching position, the means for this as shown, consist of a link 302 (see Figs. 4 and 5) pivoted at 304 to arm 342 and at its other end pivoted at 303 to plate 216, which is freely pivoted on rod 217. A similar plate 216 is also freely pivoted on the same shaft 217 and the two are connected together by a universal rod and are all one piece of metal. The catch levers rest against this rod 216 and are normally held upward out of engagement with the catches on the pin box supports and are lowered down into engagement at the proper time. When universal bar 264 drops, it turns bar 216 downward, permitting the engagement of the catches. They are now in position for the borrowing operation whenever it becomes necessary. Toward the close of the operation of the machine, when bar 264 is moved back to its normal position, bar 216 also moves to the left, as shown in Fig. 5, and lifts the catch levers 268, etc., out of engagement, permitting the pin box supports and their pin boxes to drop back into their original positions.

The pin box for use in the tens-of-minutes column is illustrated in Fig. 13. 346 is the support, 381 the supporting struts, 377 the pins, which here are six in number, 379 their springs, 380 their collars and 369 an upwardly projecting guide working in slot in plate 67.

*Impulse mechanism.*—This is specially illustrated in Figs. 1, 2, 7, 8, 9, and 10. Any suitable impulse mechanism may be employed. I will now proceed to describe that shown in the drawings. This impulse mechanism is actuated by means of the reciprocation of handle 2. It rocks main driving shaft 32 and through it operates various parts of the mechanism. It is arranged so that in the earlier part of the operation, motion will be transmitted from handle 2 to the main driving shaft in a yielding or flexible manner in order to perform the lighter and more delicate operations such as moving the time-of-day type-wheels and the elapsed time type-wheels and punch selectors to their proper positions to correspond to the condition of the timing cams and in the latter part of the operation to transmit such motion in a rigid manner to perform the heavier or less delicate operations such as the actual printing or punching. In the earlier part motion is transmitted through springs 93, 93 and in the latter part by a rigid connection to be described. The details are as follows: Handle 2 is fastened to a short shaft 5 mounted in housing 4 (Figs. 1 and 7). Fast on shaft 5 is pinion 72 meshing with toothed sector 73 pivoted at 74 (Fig. 7) between side frame 68 and bracket 75. 81 is an arm integral with sector 73 and has connected to it at 82 four tension springs 93, 93, 92 and 408. The ends of springs 92 and 408 are fastened to anchorage pieces 120 which are fastened to stud 96, secured in the side frame 68 and to arm 81. These two springs merely serve to return arm 81 and its connecting parts, including handle 2, to their original positions on the close of the operation. The two springs 93 are secured at their lower end to a casting 95 fast on a main driving shaft 32 and at their upper ends to an anchorage 414, secured to arm 81, see Fig. 7. The object of these springs is to impart movement to the main driving shaft upon which are situated the various cams which drive different parts of the mechanism. In the operation of the machine handle 2 is pulled forward, as shown in Fig. 1, rotating pinions 72, sector 73 and arm 81 as indicated by the arrow in Fig. 7, stretching all of the springs and through the two springs 93 tending to rock shaft 32 as shown by the arrow in Fig. 7. I preferably provide retarding means to prevent a too sudden operation of the parts through handle 2. For this purpose casting 95 has an arm 94 integral with it pivoted at 118 to the casing of dashpot 115 and tending to pull the casing downward as shaft 32 rocks. 112 is the piston rod pivoted at 108 to the frame work. The other parts of the dashpot are of an ordinary construction. The effect of the dashpot is to retard the movement of shaft 32 and prevent excessive speed on either the forward or return movement of the parts and thus avoid sudden jars and shocks and to cause the mechanism to run more smoothly.

When handle 2 is turned forward motion is imparted to shaft 32 only through springs 93, thus giving a yielding or flexible connection in the early part of the movement. The lever 94 of the dashpot and shaft 32 cannot respond to this pull faster than at a certain prescribed rate. It will be understood that handle 2, including arm 81, may at first move more rapidly than casting 95 and shaft 32, springs 93 being stretched in this operation. The latter will, of course, in time retract and cause casting 95 to overtake the movement of arm 81.

When the lighter operations have been performed and the heavier work, such as the printing or the punching, is to be performed a rigid connection between the operating means and the shaft 32 is provided by means of the following mechanism: Connecting arm 81 with casting 95 is a link 83 pivoted at 97 to the casting and provided at its other end with slot 86 through which projects pin 87 from arm 81. Pivoted to pin 87 at the point 87 is hook piece 88 having at its lower end a hook 412 on one side and a hook 411 on the other and resting against pin 89 mounted on the side frame and held in approximate position by spring 90 mounted on link 83 and resting in the depression 413 at the bottom of 88. 91 is a block fast on the back of link 83, indicated in dotted lines in Fig. 7. In the first upward movement of arm 81 pin 87 slipping loosely in slot 86 exerts no upward pull on link 83. Hook piece 88, however, is pulled upward by arm 81 until hook 412 engages a projecting pin 84 (Fig. 7), secured to the frame work. The angular relation of hook piece 88 and pin 84 is such that hook 412 would be forced off pin 84 but for the fact that hook piece 88 which is in the same plane as block 91, is against 91. In this position of the parts the upward movement of arm 81 and hook piece 88 is momentarily arrested. Shortly thereafter, however, springs 93 pull forward casting 95 and with it link 83 until the lower part of block 91 passes hook 411, whereupon hook piece 88 is forced to the right, as viewed in Fig. 7, and hook 411 catches under the lower left hand corner of block 91. A further upward movement of arm 81 causes casting 95 to rise upward, further rocking shaft 32 and thus movement is transmitted, not through the springs, but through the rigid connection consisting of hook piece 88, hook 411, block 91 and link 83. The connection is now a rigid one and the further rocking of shaft 32 by handle 2 is accomplished through this rigid connection. It is during this rigid connection that the heavier parts of the work are performed, such as the printing and the punching. At the close of the operation springs 92 and 408 return arm 81 and its connecting parts, including handle 2, to their original positions and this movement through link 83 returns casting 95 and shaft 32 and their connections to their original position.

*Printing mechanism.*—This is particularly illustrated in Figs. 3, 4, 5, 6, 8 and 9. It consists of two pressure printing pads 137 and 318, pad 137 printing the elapsed time records and 318 printing the time-of-day records. Referring to the printing pad 318, this pad stands opposite the time-of-day printing wheels 365, 424, 422 and 148 and prints the time-of-day at every operation of the handle 2. This is accomplished by a fork lever 316, Fig. 6, which has meshing with it a round nose of a projecting end of operating lever 315 fast on shaft 202. Shaft 202 rocks every time that punching mechanism works and so every time that machine is operated. Printing pad 318 mounted on the end of 293 is adjusted relatively to lever 316 by means of an eccentric similar to 135 (Fig. 8), fast on the arm of the printing pad, revolved by screw 317. Eccentric 135 has a worm wheel (not shown) cut on its surface engaging with the screw threads of screw 317. Lever 316 is loosely mounted on stationary shaft 133. By turning screw 317 the printing hammer is adjusted. On every operation of the handle lever 315 is moved and printing pad 318 is forced against the inking ribbon, card and time-of-day type wheels, printing the time-of-day upon the space of the the card then opposite the hammer of the printing wheels.

Hammer 137 is connected so as to be operated only on the "out" or second operation of the machine and for this means a cut-out mechanism is provided in the connections between the lever 138 and the printing pad 137. The particular mechanism for this purpose is as follows: 142 is a shaft extending from side frame 66 to side frame 68 and carrying on it near its left end as viewed in Fig. 8 a boss 633 which has fast to it at one end the detector arm 319 (Fig. 6) and on its other end the short lever arm 627. This latter arm has pivoted at its upper end a link 626 pivoted to it at 628. In the early part of the operation of this machine this link has a tension put upon it tending to pull it to the right as viewed in Fig. 6 and thus causes the detector arm 319 to move forward and to pass through the detector slot if it encounters no card in the slot. This tension is produced by means of the spring 631 (see Fig. 4) which is secured to the stud 632 which is mounted on the bar 302. Its other end is attached to the sliding bar 626 which is loosely mounted on the piece 302, which actuates the universal bar 216 of the subtractor mechanism. The lever 627 is connected by link 626 and the stud 629 (see Fig. 9). As a result of this when the lever 342 moves and the detector 319 encounters a card which has been inserted in either one of the card slots the spring 631 takes up the motion as lever 342 moves at every operation of the machine while the detector 319 can only move a portion of its full stroke if a card has been inserted in the slot. If it encounters a card as it will in the "in" operation, the arm will be held back and will not operate the catch to connect lever 138 with printing pad 137. If, however, it does not encounter a card as it will on the second or "out" operation, because in the "out" operation a detent in the card, shown at 623 in Figs. 42 and 43, will then be opposite the end of the detector arm 319 and will permit that arm to pass through the slot. The clutch is particularly illustrated in Figs. 3 and 8 and consists of a pawl 301 loosely pivoted at 544 to lever 307 which is fast to printing pad 137 through a similar adjusting device already described with reference to pad 318, namely, worm and rod 135 shown in Fig. 8.

141 is an arm fast on shaft 142 and carries at its upper end a pin 140 which has resting against it the tail of clutch pawl 301. A tension spring 409 fast to lever 307 and to the pawl tends to draw the pawl to the right as viewed in Fig. 3 and holds it against pin 140. Normally pin 140 holds the clutch out of engagement with an arm 304 having at its upper end pin 305 engaging slot arm 132. When shaft 142 rocks to the right it permits clutch 301 to move to the right until its tooth engages with the end of arm 304. This operation takes place only when the upper end of detector arm 319 is permitted by detent 623 to move into the slot and this, as already described only takes place on the out operation of the machine. When this occurs lever 138 through slotted arm 132, pin 305 and arm 304 forces pawl 301 to the left as viewed in Fig. 3 and acting through arm 307, and pin 135 (Fig. 8) forces printing pad 137 against the ink ribbon, card and elapsed time type-wheels, printing the elapsed time upon the card. At all other times the rocking movement of slotted arms 132 and 304 has no effect on printing pad 137 as clutch 301 is then out of engagement with arm 304. It will be understood, of course, that clutch 301, arm 307 and printing pad 137 are loosely mounted on shaft 133.

By the above means the clutch is normally out of clutching connection and the printing pad 137 is inoperative. It only becomes operative when detent 623 is opposite the end of detector arm 319 and this occurs only on the "out" operation. Accordingly the type on the elapsed time type-wheels will never print except on the "out" operation.

*Ink ribbon mechanism.*—This is specially illustrated in Figs. 2, 7, 8 and 9. It consists of the ordinary ribbon spools mounted on studs and fed forward by ratchet wheels. One of these spools 42 is shown in Fig. 2. 44 is the ratchet wheel for feeding it forward. The spool is mounted on stud 43. 37 is a click pawl mounted on stud 497 provided with a tail 38 which rests against the lower edge of feeding pawl 34. This feeding pawl is mounted on the upper end of lever 35 and has a downwardly projecting tail 512 connected by a tension spring 39 with a tail 511 of a click pawl 37. Lever 35 is fast at 36 as is also a feeding lever 31. Pawl 34 has an elongation 40 to engage the shifting mechanism, presently described. Lever 31 has a slot 33 in its upper end so shaped that when pin 30, fast to arm 29, secured to main driving shaft 32, is rocked by the shaft, lever 31 will be moved forward or to the right as shown in Fig. 2, during the first part of the stroke and will then remain stationary while pin 30 completes its travel in the uppermost part of slot 33, owing to the inclination of that slot to the left as shown in Fig. 2. The other ribbon spool 105 as shown in Fig. 7, is mounted on stud 107 and has ratchet 106. 101 is a click pawl, 102 its surface bearing on feeding pawl 98, the latter having elongation 104 and being pivoted to lever 100 at 99, lever 100 being fast on shaft 36. 98 has a tail 514 provided with a spring 103 connecting it to tail 513 of click pawl 101. These parts are similar in all respects to those already described with reference to spool 42.

As any suitable shifting mechanism may be used, none is shown.

In order to guide the pin boxes in their movement toward and away from the card slots I preferably provide grooves in a flat plate 67 (Figs. 4, 5 and 10). Plate 67 is fastened to side frames 66 and 68. Upon the top of each of the pin boxes are projecting guide pieces 286, 375, 369 and 204 respectively, the projections moving in the slots and guiding the pin boxes. Plate 67 also carries the card guides 466, 466.

The method of fastening the cover of the casing is illustrated in Figs. 2 and 7. There are four downwardly projecting lugs extending from the top plate 3, two in front numbered 46 and 76 and two in the rear numbered 48 and 109. These depend in such a position as to be adjacent to the outside of the side frames and the side frames are attached to these lugs by screws, 45, 77, 49 and 110, so that the machine is supported by the top plate 3 which has its edges resting on the table or other support.

*Cut-out mechanism for disconnecting and connecting the elapsed time timing cams with their driving means.*—This is specially illustrated in Figs. 10, 14, 15 and 16. 269 is the minute actuating pawl of the minute ratchet wheel 266. This pawl has a pin projecting sidewise from it. The normal position of this pin is that of the dotted lines 522 shown in Fig. 16. In this position it engages the teeth of ratchet 266 and at every actuation of the frame 382 as already described the pawl rises and feeds ratchet wheel 266 and with it elapsed time minute cam 254. This is the position of the parts during working hours and while the pawl and pin are in this position all of the elapsed time timing cams are fed forward. They are in this position from the time that contact 587 on disk 584 passes contact arms 586 and 635, until contact piece 588 closes the contact between 636 and 586 as already described. Immediately at the end of the next operation of pawl 269 cam 536 snaps beneath pin 522 when in its uppermost position and when this pin is moved downwardly with its pawl it rides outside and upon the exterior surface of cam 536. In Fig. 16 it is shown in this position by the left dotted lines 522. On each succeeding actuation of pawl 269 pin 522 rides upward and downward on cam 536, thus keeping the pawl out of engagement with its ratchet wheel 266. During this time the projection 392 (see Fig. 24) on the pawls of higher denomination keep all of those pawls out of engagement with their respective ratchet wheels so that none of the elapsed time timing cams are fed forward. This lasts until the next contact piece 589 on disk 584 restores pin 522 to its original position, whereupon pawl 269 and the other pawls of higher denominations begin again to feed their respective ratchets and the timing cams are again fed forward. When contact piece 589 on disk 584 makes contact with contact pieces 586 and 635 pin 522 is outside of cam 536 and no feeding takes place until the contact piece 589 operates contact pieces 586 and 635.

The means for throwing the pin 522 into the one or the other of these two positions are shown in Figs. 14, 15 and 16 and are as follows. It consists of an electromagnet 523 which is supported by the bent metal piece 538 which encircles the shaft 50 upon which the cams of the time-of-day mechanism are located. The piece 538 is bent out so as to form bearings 526 in the ears 527 for the armature 524. The armature is kept from the magnet by the tension spring 529. Armature 524 is pivoted at 526 to the frame 527. This spring 529 is fastened at its other end to lever 530 which is provided with a cam wiper 531 carried at its other end cam surface 536. Lever 530 is pivoted at 537 to the stationary piece 538 and has a cam part 536 that at times engages the pin 522 as described. Also fast to the armature 524 is a pawl 542 pivoted at 528 and having a tension spring 541 to hold the top of the pawl in contact with the ratchet 534. A stud 535 is securely fastened to the sheet metal supporting member 527 for the nose of the pawl 542 to engage with and thus prevent overthrow. The ratchet 534 is fastened to the cam wheel 532 and they are loosely mounted on the stud 533 which is fastened to the supporting member 527 as shown. A click pawl 543 is pivoted at 539 to engage the ratchet 534 and is kept in that position by the tension spring 541 secured to it at 540 to prevent backward rotation. A stop pin 525 is arranged to keep the armature in position. As will be seen from Fig. 14 there are twice as many teeth in the ratchet 534 as there are rises on the cam 532, consequently every time the magnet 523 operates the pawl 542 feeds the ratchet 534 forward one tooth and the lever arm 530 is alternately left on a rise or opposite a depression of the cam 532. When magnet 523 is thus energized, with pawl 269 and its pin 522 in their normal position, that is with the pawl in engagement with its ratchet 266, and cam wiper 531 comes opposite to a depression in cam wheel 532 the cam wiper cannot move down into the depression because the side of its cam surface 536 rests against the end of pin 522 and holds the lever 530 in the position shown in Fig. 14. But on the next upward movement of pawl 269 and pin 522, the pin 522 rises above the sloping surface of cam 536, whereupon lever 530 is pulled by spring 529 so that cam wiper 531 moves downward into a depression of cam 532 and the upper sloping surface of cam 536 moves under pin 522. At the next downward movement of pin 522 and its pawl 269 the pin rides on the outer surface of cam 536 as already described and continues to ride on it in its upward and downward movement, thus keeping pawl 269 and the pawls of the higher wheels out of engagement with their respective ratchets until the next contact piece on disk 584 energizes magnet 523, whereupon cam wiper 531 of lever 530 is pushed downward on to a rise of the cam and cam 536 is swung to the side of pin 522. Thereupon spring 271 (Fig. 18) of pawl 269 throws the pawl and pin into their right hand position shown in Fig. 16, thus throwing that pawl and the pawls of the higher timing cams into engagement with their respective ratchet wheels. The timing cams are then fed on until pin 522 again throws the pawls out of engagement in the manner already described.

The electrical connection between the case and the machine I will now describe. This connection is for the purpose of enabling the machine to be taken out of its case or box and be put back again or another machine be put into the same box without the necessity of any wiring. Mounted on the case 7 are three binding posts 300, 294 and 299 (Fig. 8). Time-of-day wire 609 is connected with binding post 300, common wire 610 with 294 and the cut-out mechanism wire 611 with 299. Insulating block 10 is fast upon the binding posts and binding post 300 has fastened to it contact plate 298, and binding post 294 has fast to it contact plate 11 and 299 has fast to it contact plate 297. Contact plate 298 is on the inside of cheek 296 of plate 10. All of the above parts form one integral structure and are mounted on the casing 7. 295 is an insulating block fast to the side casting 66 of the mechanism of the machine and is fastened to it by screws 27. This piece carries on it top contact plate 28 adapted to rest upon and make contact with plate 11. 642 is a contact plate fastened on one side of block 295 and resting against and making contact with time-of-day plate 298. 12 is a contact plate fastened to the other side of block 295 and resting against and making contact with cut-out plate 297. Block 295 and contact plates 642 and 12 and 28 are all fastened together and to the side frame 66. The three contact plates 642, 12 and 28 are connected with their respective wires. When the mechanism of an indicating machine is put into its case or taken out, block 295 and its contacts slip into position in the interior space left for them in block 10, and the contact plates rest against their respective plates. Screws 448 hold them firmly in position.

Window 6 is placed in a round window frame 641 (Fig. 6), preferably held in locked position by means of a locking device (not shown) of which 477 is the key hole. Immediately beneath the window 6 are the time-of-day indicating wheels 404 the minutes, 405 the tens of minutes, 406 the hours and 407 the "A. M." and "P. M." This construction not only enables the time to be seen but it also affords a ready access to the time-of-day indicating wheels and their cams, so that if necessary, these may be set at the true time without taking the machine out of the case.

It will, of course, be understood that in using the terms "adding" or "subtracting" in this specification or the claims I intend to include the complement of these terms as a full equivalent. Thus, for example, instead of adding six points to any movement, the same result exactly would be obtained upon the adding mechanism by subtracting its complement, viz., by subtracting 4 and the above terms are used broadly to include such complement.

The term "card" as used herein is used broadly to indicate any proper record surface, no matter of what material it is made or what its shape. The time marks upon such a card are not necessarily restricted to holes punched therein, as any suitable marks capable of actuating computing devices are within their meaning. It will also, of course, be understood that in the specification and claims the use of any language indicating the movement of one part toward or to another part would include the movement of the second toward or to the first as a full equivalent thereof so long as the same result is obtained.

In the machine shown storing timing cams or cams capable of indefinite expansion and including only working hours are shown. Any suitable clock-controlled mechanism may however be employed in their place for controlling the elapsed time printing mechanism and the punching devices. I prefer to use only one set of punches adapted to punch at both the "in" and the "out" operations, but if desired separate sets of punches may be used for these different purposes. I also preferably use the same set of differentials for both the elapsed time printing mechanism and the punching devices, although separate sets may also be used for these purposes if desired.

The punching devices are shown as punching holes in the cards. They may of course punch other marks than holes, so long as the same functions and results are obtained.

The magnets employed in the driving mechanism are preferably electromagnets. Preferably one magnet is fixed and the other movable, although both may be made movable provided such movement is caused to actuate the timing cams. In the machine shown the magnets operate by attraction and upon their energization. Of course with suitable changes repulsion or deënergization of the magnets could be used for the same purposes. Preferably and in the form of machine shown, the relative movement of the magnets with respect to each other is at an angle to the direction of the lines of force. Many other modifications and changes in addition to those indicated may of course be made in the form of apparatus shown in the drawings without departing from my invention.

My improvement possesses many advantages, some of which have been already set forth in one way or another in this specification. By means of it elapsed time is not only printed on the card, but is also punched, thus affording not only a check upon the correctness and accuracy of the mechanism, but being also useful for obtaining totals of the work done by a number of workmen. By means of my improved driving mechanism a stronger and longer magnetic pull is obtained and the leverage is in favor and not against the movement. Accordingly less power is required and weaker batteries and smaller wiring may be employed. This not only makes the construction and operation of such a device very much cheaper but enables it to be used by persons not experts and in small installations.

What I claim as new and desire to secure by Letters Patent, is:—

1. The combination of an elapsed time type wheel, a differential controlled one way by clock mechanism and the other way by time identification marks upon a card representing the time of an earlier operation of the machine, and a punching device controlled by the differential and adapted to punch holes in accordance with the condition of the differential, whereby on a first operation of the machine the time of such operation or "in" time may be punched and on a second operation of the machine the elapsed time between the two operations may be punched.

2. The combination of elapsed time printing mechanism, a differential, a timing cam, adapted at certain predetermined periods of time to be driven by clock mechanism and at other periods to be disconnected therefrom, connections between the differential and the timing cam adapted to move the former to correspond with the condition of the latter, a subtracting device for moving the differential the reverse way, a time identification mark in a card representing the time of a prior operation of the machine adapted to control the said subtracting device in accordance with such prior time, a punching device controlled by the differential and adapted to punch holes in a card in accordance with the condition of the differential, whereby on a first operation of the machine the time of such operation or the "in" time may be punched and on a second operation the elapsed time between the two operations may be punched.

3. In an elapsed time indicating machine the combination of elapsed time indicating mechanism, a punching device, a differential adapted to be moved one way in accordance with the time of an operation of the machine and to be moved the other way in accordance with the time of an earlier operation of the machine, and connections between the differential and the elapsed time printing mechanism and punching device adapted to move said mechanism and device in accordance with its position, whereby at a first operation of the machine the position of the elapsed time printing mechanism and the punching device will represent the time of said operation and at a second operation of the machine the printing mechanism and the punching device will represent the elapsed time between the two operations.

4. In an elapsed time indicating machine, the combination of an elapsed time type wheel, a punching device, a differential, connections between the differential and the printing mechanism and the punching device to move both of the latter to correspond with the condition of the differential at any time, a clock-controlled timing cam, connections between the differential and the timing cam adapted at any time to move the differential one way to correspond with the condition of the timing cam, and a subtracting device adapted to move the differential in a reverse direction, and a time identification mark on a card representing the time of a prior operation of the machine and adapted to control the extent of movement of the subtracting device in accordance with such prior time, whereby the type wheel and the punching device will by their position represent the position of the differential and may be caused to print and to punch the time of a first operation of the machine and the elapsed time between such operation and a second or later operation.

In testimony whereof, I have signed my name to this specification, in the presence of two subscribing witnesses.

JAMES WARES BRYCE.

Witnessess
 JOHN O. GEMPLER,
 EDWIN SEGER.

Copies of this patent may be obtained for five cents each, by addressing the "Commissioner of Patents, Washington, D. C."